(12) United States Patent
Basu Mallick et al.

(10) Patent No.: US 10,397,269 B2
(45) Date of Patent: *Aug. 27, 2019

(54) SECURITY KEY DERIVATION IN DUAL CONNECTIVITY

(71) Applicant: Sun Patent Trust, New York, NY (US)

(72) Inventors: Prateek Basu Mallick, Langen (DE); Joachim Loehr, Wiesbaden (DE)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/110,416

(22) Filed: Aug. 23, 2018

(65) Prior Publication Data
US 2018/0367564 A1 Dec. 20, 2018

Related U.S. Application Data

(63) Continuation of application No. 15/121,357, filed as application No. PCT/EP2015/054400 on Mar. 3, 2015, now Pat. No. 10,116,685.

(30) Foreign Application Priority Data

Mar. 21, 2014 (EP) ..................................... 14001067

(51) Int. Cl.
*H04L 29/06* (2006.01)
*H04W 12/04* (2009.01)
(Continued)

(52) U.S. Cl.
CPC .......... *H04L 63/1441* (2013.01); *H04L 63/06* (2013.01); *H04L 63/068* (2013.01);
(Continued)

(58) Field of Classification Search
CPC .................................................. H04L 63/1441
See application file for complete search history.

(56) References Cited

U.S. PATENT DOCUMENTS

| 5,241,598 A | 8/1993 | Raith |
| 5,436,914 A | 7/1995 | Augustine et al. |

(Continued)

FOREIGN PATENT DOCUMENTS

| CN | 102026176 A | 4/2011 |
| CN | 102215485 A | 10/2011 |

(Continued)

OTHER PUBLICATIONS

3GPP TS 33.401 V12.10.0, 3$^{rd}$ Generation Partnership Project; Technical Specification Group Services and System Aspects; 3GPP System Architecture Evolution (SAE); Security architecture (Release 12), Dec. 2013, 121 pages.

(Continued)

*Primary Examiner* — Shawnchoy Rahman
(74) *Attorney, Agent, or Firm* — Seed IP Law Group LLP

(57) ABSTRACT

The disclosure relates to methods for establishing a secure communication link between a mobile station and a secondary base station in a mobile communication system. The disclosure is also providing mobile communication system for performing these methods, and computer readable media the instructions of which cause the mobile communication system to perform the methods described herein. Specifically, the disclosure suggests that in response to the detected or signaled potential security breach, the master base station increments a freshness counter for re-initializing the communication between the mobile station and the secondary base station; and the mobile station and the secondary base station re-initialize the communication there between. The re-initialization is performed under the control of the master base station and further includes deriving a same security key based on said incremented freshness counter, and establishing the secure communication link utilizing the same, derived security key.

10 Claims, 15 Drawing Sheets

(51) Int. Cl.
*H04W 76/19* (2018.01)
*H04W 76/15* (2018.01)

(52) U.S. Cl.
CPC ......... *H04L 63/1416* (2013.01); *H04W 12/04* (2013.01); *H04W 76/15* (2018.02); *H04W 76/19* (2018.02); *H04L 2463/061* (2013.01)

(56) References Cited

U.S. PATENT DOCUMENTS

| | | | |
|---|---|---|---|
| 8,107,397 B1* | 1/2012 | Bagchi | H04L 9/0822 370/254 |
| 8,627,422 B2 | 1/2014 | Hawkes et al. | |
| 8,730,912 B2* | 5/2014 | Drapkin | H04W 12/04 370/331 |
| 9,077,772 B2* | 7/2015 | Hui | H04L 67/12 |
| 9,215,700 B2 | 12/2015 | Zhang et al. | |
| 2001/0002486 A1* | 5/2001 | Kocher | G06F 7/723 713/171 |
| 2009/0016301 A1 | 1/2009 | Sammour et al. | |
| 2010/0284304 A1 | 11/2010 | Mao et al. | |
| 2014/0229739 A1* | 8/2014 | Roth | G06F 21/6218 713/189 |
| 2015/0256335 A1* | 9/2015 | Lin | H04L 9/0819 380/255 |
| 2017/0235848 A1* | 8/2017 | Van Dusen | H04L 41/04 705/12 |

FOREIGN PATENT DOCUMENTS

| | | |
|---|---|---|
| CN | 102415115 A | 4/2012 |
| WO | 2014/015478 A1 | 1/2014 |
| WO | 2014/120077 A1 | 8/2014 |
| WO | 2015/037926 A1 | 3/2015 |
| WO | 2015115578 A1 | 8/2015 |

OTHER PUBLICATIONS

3GPP TS 36.211 V8.0.0, $3^{rd}$ Generation Partnership Project; Technical Specification Group Radio Access Network; Evolved Universal Terrestrial Radio Access (E-UTRA); Physical channels and modulation (Release 8), Sep. 2007, 50 pages.

3GPP TS 36.323 V11.2.0, $3^{rd}$ Generation Partnership Project; Technical Specification Group Radio Access Network; Evolved Universal Terrestrial Radio Access (E-UTRA); Packet Data Convergence Protocol (PDCP) specification (Release 11), Mar. 2013, 27 pages.

NEC Corporation, "Security freshness counter value," R2-140581, 3GPP TSG RAN2 Meeting #85, Agenda Item: 7.2.1, Prague, Czech Republic, Feb. 10-14, 2014, 4 pages.

NTT Docomo, Inc., R2, "Introduction of Dual Connectivity," R2-140906, 3GPP TSG-RAN WG2 #85, Prague, Czech Republic, Feb. 10-14, 2014, 46 pages.

International Search Report dated Aug. 6, 2015, for corresponding International Application No. PCT/EP2015/054400, 1 page.

Extended European Search Report dated Sep. 18, 2014, for corresponding EP Application No. 14001067.9-1853, 7 pages.

First Office Action, dated Sep. 4, 2018, for the corresponding Chinese Patent Application No. 201580014724.4, 12 pages.

Written Opinion, dated Jul. 27, 2018, for corresponding Singapore Patent Application No. 11201607723U, 8 pages.

Notice of Reasons for Rejection, dated Oct. 2, 2018, for Japanese Patent Application No. 2016-557912, 6 pages (with English translation).

"3GPP TSG RAN WG2 Meeting #85", R2-140813, Prague, Czech Republic, Feb. 10-14, 2014, 2 pages.

"3GPP TSG-RAN WG2 Meeting #85-bis", R2-141264, Valencia, Spain, Mar. 31-Apr. 4, 2014, 3 pages.

* cited by examiner

SECURITY KEY DERIVATION IN DUAL CONNECTIVITY

BACKGROUND

Technical Field

The disclosure relates to methods for establishing a secure communication link between a mobile station and a secondary base station in a mobile communication system comprising the mobile station, a master and the secondary base station. The disclosure is also providing a mobile station and base stations for participating and for performing the methods described herein.

Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall architecture is shown in FIG. 1 and a more detailed representation of the E-UTRAN architecture is given in FIG. 2. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipment, the SGW terminates the downlink data path and triggers paging when downlink data arrives for the user equipment. It manages and stores user equipment contexts, e.g., parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipment. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipment.

Component Carrier Structure in LTE

The downlink component carrier of a 3GPP LTE system is subdivided in the time-frequency domain in so-called sub-frames. In 3GPP LTE each sub-frame is divided into two downlink slots as shown in FIG. 3, wherein the first downlink slot comprises the control channel region (PDCCH region) within the first OFDM symbols. Each sub-frame consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consists of a number of modulation symbols transmitted on respective $N_{RB}^{DL} \times N_{sc}^{RB}$ subcarriers as also shown in FIG. 4.

Assuming a multi-carrier communication system, e.g., employing OFDM, as for example used in 3GPP Long Term Evolution (LTE), the smallest unit of resources that can be assigned by the scheduler is one "resource block". A physical resource block (PRB) is defined as $N_{symb}^{DL}$ consecutive OFDM symbols in the time domain (e.g., 7 OFDM symbols) and $N_{sc}^{RB}$ consecutive subcarriers in the frequency domain as exemplified in FIG. 4 (e.g., 12 subcarriers for a component carrier). In 3GPP LTE (Release 8), a physical resource block thus consists of $N_{symb}^{DL} \times N_{sc}^{RB}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", section 6.2, available at http://www.3gpp.org and incorporated herein by reference).

One sub-frame consists of two slots, so that there are 14 OFDM symbols in a sub-frame when a so-called "normal" CP (cyclic prefix) is used, and 12 OFDM symbols in a sub-frame when a so-called "extended" CP is used. For sake of terminology, in the following the time-frequency resources equivalent to the same $N_{sc}^{RB}$ consecutive subcarriers spanning a full sub-frame is called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure apply to later releases too.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g., to fulfill the requirements on IMT-Advanced.

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers (component carriers) are aggregated in order to support wider transmission bandwidths up to 100 MHz. Several cells in the LTE system are aggregated into one wider channel in the LTE-Advanced system which is wide enough for 100 MHz even though these cells in LTE are in different frequency bands.

All component carriers can be configured to be LTE Rel. 8/9 compatible, at least when the aggregated numbers of component carriers in the uplink and the downlink are the same. Not all component carriers aggregated by a user equipment may necessarily be Rel. 8/9 compatible. Existing mechanism (e.g., barring) may be used to avoid Rel-8/9 user equipment to camp on a component carrier.

A user equipment may simultaneously receive or transmit one or multiple component carriers (corresponding to multiple serving cells) depending on its capabilities. A LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain using the 3GPP LTE (Release 8/9) numerology.

It is possible to configure a 3GPP LTE-A (Release 10) compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may not be possible to configure a mobile terminal with more uplink component carriers than downlink component carriers.

In a typical TDD deployment, the number of component carriers and the bandwidth of each component carrier in uplink and downlink is the same. Component carriers originating from the same eNodeB need not to provide the same coverage.

The spacing between center frequencies of contiguously aggregated component carriers shall be a multiple of 300 kHz. This is in order to be compatible with the 100 kHz frequency raster of 3GPP LTE (Release 8/9) and at the same time preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

The Layer 2 structure with activated carrier aggregation is shown in FIG. 5 and FIG. 6 for the downlink and uplink respectively.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g., TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC). The characteristics of the downlink and uplink PCell are:

For each SCell the usage of uplink resources by the UE, in addition to the downlink ones is configurable; the number of DL SCCs configured is therefore always larger or equal to the number of UL SCCs, and no SCell can be configured for usage of uplink resources only The uplink PCell is used for transmission of Layer 1 uplink control information The downlink PCell cannot be de-activated, unlike SCells From UE perspective, each uplink resource only belongs to one serving cell The number of serving cells that can be configured depends on the aggregation capability of the UE Re-establishment is triggered when the downlink PCell experiences Rayleigh fading (RLF), not when downlink SCells experience RLF The downlink PCell cell can change with handover (i.e., with security key change and RACH procedure)

Non-access stratum information is taken from the downlink PCell

PCell can only be changed with handover procedure (i.e., with security key change and RACH procedure)

PCell is used for transmission of PUCCH

The configuration and reconfiguration of component carriers can be performed by RRC. Activation and deactivation is done via MAC control elements. At intra-LTE handover, RRC can also add, remove, or reconfigure SCells for usage in the target cell. When adding a new SCell, dedicated RRC signaling is used for sending the system information of the SCell, the information being necessary for transmission/reception (similarly as in Rel-8/9 for handover).

When a user equipment is configured with carrier aggregation there is one pair of uplink and downlink component carriers that is always active. The downlink component carrier of that pair might be also referred to as 'DL anchor carrier'. Same applies also for the uplink.

When carrier aggregation is configured, a user equipment may be scheduled over multiple component carriers simultaneously but at most one random access procedure shall be ongoing at any time. Cross-carrier scheduling allows the PDCCH of a component carrier to schedule resources on another component carrier. For this purpose a component carrier identification field is introduced in the respective DCI formats, called CIF.

A linking between uplink and downlink component carriers allows identifying the uplink component carrier for which the grant applies when there is no cross-carrier scheduling. The linkage of downlink component carriers to uplink component carrier does not necessarily need to be one to one. In other words, more than one downlink component carrier can link to the same uplink component carrier. At the same time, a downlink component carrier can only link to one uplink component carrier.

Small Cell Deployment Scenarios

Explosive demands for mobile data are driving changes in how mobile operators will need to respond to the challenging requirements of higher capacity and improved Quality of user Experience (QoE). Currently, fourth generation wireless access systems using Long Term Evolution (LTE) are being deployed by many operators worldwide in order to offer faster access with lower latency and more efficiency than 3G/3.5G system.

The anticipated future traffic growth is so tremendous that there is a vastly increased need for further network densification to handle the capacity requirements, particularly in high traffic areas (hot spot areas) that generate the highest volume of traffic. Network densification—increasing the number of network nodes, thereby bringing them physically closer to the user terminals—is a key to improving traffic capacity and extending the achievable user-data rates of a wireless communication system.

In addition to straightforward densification of a macro deployment, network densification can be achieved by the deployment of complementary low-power nodes respectively small cells under the coverage of an existing macronode layer. In such a heterogeneous deployment, the low-power nodes provide very high traffic capacity and very high user throughput locally, for example in indoor and outdoor hotspot locations. Meanwhile, the macro layer ensures service availability and QoE over the entire coverage area. In other words, the layer containing the low-power nodes can also be referred to as providing local-area access, in contrast to the wide-area-covering macro layer.

The installation of low-power nodes respectively small cells as well as heterogeneous deployments has been possible since the first release of LTE. In this regard, a number of solutions have been specified in recent releases of LTE (i.e., Release-10/11). More specifically, these recent releases introduced additional tools to handle inter-layer interference in heterogeneous deployments. In order to further optimize performance and provide cost/energy-efficient operation, small cells require further enhancements and in many cases need to interact with or complement existing macro cells.

Such optimizations are to be investigated as part of the further evolution of LTE—Release 12 and beyond. In particular further enhancements related to low-power nodes and heterogeneous deployments will be considered under the umbrella of the new Rel-12 study item (SI) "Study on Small Cell Enhancements for E-UTRA and E-UTRAN". Some of these activities will focus on achieving an even higher degree of interworking between the macro and low-power layers, including different forms of macro assistance to the low-power layer and dual-layer connectivity. Dual connectivity implies that the device has simultaneous connections to both macro and low-power layers.

Dual Connectivity

One promising solution to the problems which are currently under discussion in 3GPP RAN working groups is the so-called dual connectivity concept. Dual connectivity is used to refer to an operation where a given UE consumes radio resources provided by at least two different network nodes connected via a non-ideal backhaul.

In other words, in dual connectivity the UE is connected with both a macro cell (master or macro eNB) and small cell (secondary or small eNB). Furthermore, each eNB involved in dual connectivity for a UE may assume different roles. Those roles do not necessarily depend on the eNB's power class and can vary among UEs.

For use of a consistent terminology, reference is made to Stage 2 description (3GPP R2-140906) of Small Cell Enhancement in LTE where the following terms are defined as follows. A Master Cell Group, MCG, in dual connectivity describes a group of serving cells associated with the MeNB, comprising of the PCell and optionally one or more SCells. The master eNB in dual connectivity identifies the eNB which terminates at least S1-MME. In this respect, the term MCG bearer in dual connectivity refers to radio protocols only located in the MeNB to use MeNB resources.

Similarly, a Secondary Cell Group, SCG in dual connectivity describes a group of serving cells associated with the SeNB comprising of the special SCell and optionally one or more SCells. The secondary eNB in dual connectivity identifies the eNB that is providing additional radio resources for the UE but is not the Master eNB. In this respect, the term SCG bearer in dual connectivity refers to radio protocols only located in the secondary eNB to use secondary eNB resources.

Since the study item is currently at a very early stage, details on the deployment of dual connectivity are yet to be decided. For example, different architectures are still actively discussed and, hence, may influence implementation aspects of dual connectivity. Therefore, many issues/details, e.g., protocol enhancements, are still open for further development.

FIG. 7 shows an exemplary architecture for dual connectivity. Specifically, an architecture is illustrated which corresponds to what is currently understood as Architecture 1A. In this Architecture 1A, S1-U terminates in the master eNB and in the secondary eNB and the S1-MME is terminated in the master eNB.

Both the master eNB and the secondary eNB provide independently the functionality of the Packet Data Convergence Protocol (PDCP) such that the illustrated Architecture 1A is not necessary to provide split bearers, i.e., where the a bearer is split over the master eNB and the secondary eNB.

In general, it should be understood the depicted dual connectivity architecture 1A is only one among many options for realizing dual connectivity. Moreover, the concept of dual connectivity applies the following assumptions on the architecture:

Per bearer level decision where to serve each packet, C/U plane split

As an example UE RRC signaling and high QoS data such as VoLTE can be served by the Macro cell, while best effort data is offloaded to the small cell.

No coupling between bearers, so no common PDCP or RLC required between the Macro cell and small cell Looser coordination between RAN nodes SeNB has no connection to S-GW, i.e., packets are forwarded by MeNB Small Cell is transparent to CN.

Regarding the last two bullet points, it should be noted that it is also possible that SeNB is connected directly with the S-GW, i.e., S1-U is between S-GW and SeNB. Essentially, there are three different options with respect to the bearer mapping/splitting:

Option 1: S1-U also terminates in SeNB, as; depicted in FIG. 7;
Option 2: S1-U terminates in MeNB, no bearer split in RAN; and
Option 3: S1-U terminates in MeNB, bearer split in RAN.

Security

Security is a very important feature of 3GPP LTE and in 3GPP TS 33.401: "3rd Generation Partnership Project; Technical Specification Group Services and System Aspects; 3GPP System Architecture Evolution (SAE); Security architecture (Release 12)", Version 12.10.0, section 4, available at http://www.3gpp.org and incorporated herein by reference, defines five security feature groups. Each of these feature groups meets certain threats and accomplishes certain security objectives:

Network access security (I) relates to the set of security features that provide users with secure access to services, and which in particular protect against attacks on the (radio) access link.

Network domain security (II) relates to the set of security features that enable nodes to securely exchange signaling data, user data (between AN and SN and within AN), and protect against attacks on the wireline network.

User domain security (III) relates to the set of security features that secure access to mobile stations.

Application domain security (IV) relates to the set of security features that enable applications in the user and in the provider domain to securely exchange messages.

Visibility and configurability of security (V) relates to the set of features that enables the user to inform himself whether a security feature is in operation or not and whether the use and provision of services should depend on the security feature.

The security objectives are illustrated in FIG. 8 with regard to the interaction between units and between functional layers in LTE. In the remaining document, the discussion focuses on network access security.

User Data (and Signaling Data) Confidentiality: Ciphering

The user data (and signaling data) must be ciphered. The User plane confidentiality protection shall be done at PDCP layer and is an operator option. The user plane data is ciphered by the PDCP protocol between the UE and the eNB as specified in 3GPP TS 36.323: "3rd Generation Partnership Project; Technical Specification Group Radio Access Network; Evolved Universal Terrestrial Radio Access (E-UTRA); Packet Data Convergence Protocol (PDCP) specification (Release 11)", Version 11.2.0, section 5.6, available at http://www.3gpp.org and incorporated herein by reference.

Requirements for Handling User Plane Date for the eNB

It is eNB's task to cipher and decipher user plane packets between the Uu reference point and the S1/X2 reference points and to handle integrity protection for user plane packets for the S1/X2 reference points.

1. User plane data ciphering/deciphering and integrity handling shall take place inside the secure environment where the related keys are stored.

2. The transport of user data over S1-U and X2-U shall be integrity, confidentially and replay-protected from unauthorized parties. If this is to be accomplished by cryptographic means, clause 12 shall be applied except for the Un interface between RN and DeNB.

Requirements for Handling Control Plane Date for the eNB

It is eNB's task to provide confidentiality and integrity protection for control plane packets on the S1/X2 reference points.

1. Control plane data ciphering/deciphering and integrity handling shall take place inside the secure environment where the related keys are stored.

2. The transport of control plane data over S1-MME and X2-C shall be integrity-, confidentiality- and replay-protected from unauthorized parties. If this is to be accomplished by cryptographic means, clause 11 shall be applied except for the Un interface between RN and DeNB.

EPS Key Hierarchy

Requirements on EPC and E-UTRAN related to keys:

a) The EPC and E-UTRAN shall allow for use of encryption and integrity protection algorithms for AS and NAS protection having keys of length 128 bits and for future use the network interfaces shall be prepared to support 256 bit keys.

b) The keys used for UP, NAS and AS protection shall be dependent on the algorithm with which they are used.

The key hierarchy is shown in FIG. 9 includes following keys: $K_{eNB}$, $K_{NASint}$, $K_{NASenc}$, $K_{UPenc}$, $K_{RRCint}$ and $K_{RRCenc}$. In the following, reference is made to a Key Derivation Function, KDF, which is specified in Annex A.7 of 3GPP TS 33.401: "3rd Generation Partnership Project; Technical Specification Group Services and System Aspects; 3GPP System Architecture Evolution (SAE); Security architecture (Release 12)", Version 12.10.0, section 4, available at http://www.3gpp.org and incorporated herein by reference.

$K_{eNB}$ is a key derived by ME and MME from $K_{ASME}$ or by ME and target eNB.

Keys for NAS traffic:

$K_{NASint}$ is a key, which shall only be used for the protection of NAS traffic with a particular integrity algorithm This key is derived by ME and MME from $K_{ASME}$, as well as an identifier for the integrity algorithm using the KDF.

$K_{NASenc}$ is a key, which shall only be used for the protection of NAS traffic with a particular encryption algorithm. This key is derived by ME and MME from $K_{ASME}$, as well as an identifier for the encryption algorithm using the KDF.

Keys for UP traffic:

$K_{UPenc}$ is a key, which shall only be used for the protection of UP traffic with a particular encryption algorithm. This key is derived by ME and eNB from $K_{eNB}$, as well as an identifier for the encryption algorithm using the KDF.

$K_{UPint}$ is a key, which shall only be used for the protection of UP traffic between RN and DeNB with a particular integrity algorithm. This key is derived by RN and DeNB from $K_{eNB}$, as well as an identifier for the integrity algorithm using the KDF.

Keys for RRC traffic:

$K_{RRCint}$ is a key, which shall only be used for the protection of RRC traffic with a particular integrity algorithm. $K_{RRCint}$ is derived by ME and eNB from $K_{eNB}$, as well as an identifier for the integrity algorithm using the KDF.

$K_{RRCenc}$ is a key, which shall only be used for the protection of RRC traffic with a particular encryption algorithm. $K_{RRCenc}$ is derived by ME and eNB from $K_{eNB}$ as well as an identifier for the encryption algorithm using the KDF.

Intermediate Keys:

NH, referring to the Next Hop parameter, is a key derived by ME and MME to provide forward security.

$K_{eNB}^*$ is a key derived by ME and eNB when performing a horizontal or vertical key derivation.

Specifically, the key handling in handover is described in section 7.2.8 of 3GPP TS 33.401: "3rd Generation Partnership Project; Technical Specification Group Services and System Aspects; 3GPP System Architecture Evolution (SAE); Security architecture (Release 12)", Version 12.10.0, available at http://www.3gpp.org and incorporated herein by reference.

For Dual Connectivity, S-$K_{eNB}$ will be derived from the $K_{eNB}$ and a "freshness parameter" which will be for example be 16 bit long.

Intra-eNB Handover

When the eNB decides to perform an intra-eNB handover it shall derive $K_{eNB}^*$ as in Annex A.5 using target PCI, its frequency EARFCN-DL, and either NH or the current $K_{eNB}$ depending on the following criteria: the eNB shall use the NH for deriving $K_{eNB}^*$ if an unused {NH, NCC} pair is available in the eNB (this is referred to as a vertical key derivation), otherwise if no unused {NH, NCC} pair is available in the eNB, the eNB shall derive $K_{eNB}^*$ from the current $K_{eNB}$ (this is referred to as a horizontal key derivation).

The eNB shall use the $K_{eNB}^*$ as the $K_{eNB}$ after handover. The eNB shall send the NCC used for $K_{eNB}^*$ derivation to UE in HO Command message.

X2-Hanover

As in intra-eNB handovers, for X2 handovers the source eNB shall perform a vertical key derivation in case it has an unused {NH, NCC} pair. The source eNB shall first compute $K_{eNB}^*$ from target PCI, its frequency EARFCN-DL, and either from currently active $K_{eNB}$ in case of horizontal key derivation or from the NH in case of vertical key derivation as described in Annex A.5 of 3GPP TS 33.401: "3rd Generation Partnership Project; Technical Specification Group Services and System Aspects; 3GPP System Architecture Evolution (SAE); Security architecture (Release 12)", Version 12.10.0, available at http://www.3gpp.org and incorporated herein by reference.

Next the source eNB shall forward the {$K_{eNB}^*$, NCC} pair to the target eNB. The target eNB shall use the received $K_{eNB}^*$ directly as $K_{eNB}$ to be used with the UE. The target eNB shall associate the NCC value received from source eNB with the $K_{eNB}$. The target eNB shall include the received NCC into the prepared HO Command message, which is sent back to the source eNB in a transparent container and forwarded to the UE by source eNB.

When the target eNB has completed the handover signaling with the UE, it shall send a S1 PATH SWITCH REQUEST to the MME. Upon reception of the S1 PATH SWITCH REQUEST, the MME shall increase its locally kept NCC value by one and compute a new fresh NH by using the $K_{ASME}$ and its locally kept NH value as input to the function defined in Annex A.4. The MME shall then send the newly computed {NH, NCC} pair to the target eNB in the S1 PATH SWITCH REQUEST ACKNOWLEDGE message. The target eNB shall store the received {NH, NCC} pair for further handovers and remove other existing unused stored {NH, NCC} pairs if any.

KeNB Refresh

This procedure is based on an intra-cell handover. The $K_{eNB}$ chaining that is performed during a handover ensures that the $K_{eNB}$ is refreshed with respect to the RRC and UP COUNT after the procedure.

128-Bit Ciphering Algorithm

Inputs and Outputs

The input parameters to the ciphering algorithm are a 128-bit cipher key named KEY, a 32-bit COUNT, a 5-bit bearer identity BEARER, the 1-bit direction of the transmission, i.e., DIRECTION, and the length of the keystream required, i.e., LENGTH. The DIRECTION bit shall be 0 for uplink and 1 for downlink.

FIG. 10 illustrates the use of the ciphering algorithm EEA to encrypt plaintext by applying a keystream using a bit per bit binary addition of the plaintext and the keystream. The plaintext may be recovered by generating the same keystream using the same input parameters and applying a bit per bit binary addition with the ciphertext.

The use and mode of operation of the 128-EEA algorithms are specified in Annex B of 3GPP TS 33.401: "3rd Generation Partnership Project; Technical Specification Group Services and System Aspects; 3GPP System Architecture Evolution (SAE); Security architecture (Release 12)", Version 12.10.0, available at http://www.3gpp.org and incorporated herein by reference.

The input parameters to the 128-bit EEA algorithms are an 128-bit cipher key $K_{UPenc}$ as KEY, a 5-bit bearer identity BEARER which value is assigned as specified by PDCP, the 1-bit direction of transmission DIRECTION, the length of the keystream required LENGTH and a bearer specific, time and direction dependent 32-bit input COUNT which corresponds to the 32-bit PDCP COUNT.

Based on the input parameters the algorithm generates the output keystream block KEYSTREAM which is used to encrypt the input plaintext block PLAINTEXT to produce the output ciphertext block CIPHERTEXT. The input parameter LENGTH shall affect only the length of the KEYSTREAM BLOCK, not the actual bits in it.

Shortcomings of Prior Art Power Control

In dual connectivity, the security key S-K$_{eNB}$ is applicable to network access security for the secondary base station, SeNB and is comparable in its functionality to security key K$_{eNB}$ for the master base station, MeNB. The derivation of this security key S-K$_{eNB}$ shall be explained in connection with FIG. 12.

The master base station, MeNB, derives, in step 3, this security key S-K$_{eNB}$ for the communication between the mobile terminal and the secondary base station from the security key K$_{eNB}$ and a "Counter" value. Subsequently, the derived S-K$_{eNB}$ is transmitted by the master base station, MeNB, in step 4, to the secondary base station, SeNB. Thereafter, the secondary base station, SeNB derives, in step 5, the UP-encryption keys S-K$_{UPenc}$, and optionally integrity protection key S-K$_{UPint}$, from this S-K$_{eNB}$. Specifically, the SeNB derives further the UP-integrity keys from this S-K$_{eNB}$ (and if required the integrity keys for RRC Signaling and User plane and also the RRC-encryption keys). The Counter is a new 16 bit (or perhaps a different length) counter and is known as "freshness parameter".

As seen from FIG. 10, for the ciphering/encryption apart from KEY (KeNB/S-KeNB), four other input parameters are prescribed for the ciphering operation of data. Security is based on the principle that all five input parameters all should not be the same for subsequent ciphering. If they are, it represents a potential security threat. Input parameters COUNT, DIRECTION and LENGTH do not allow much degree of freedom for eNB to choose/change between different values; e.g., For UL data ciphering, the DIRECTION has to indicate "UL". For DL data ciphering, the DIRECTION has to indicate "DL".

A problem results from situations when the bearer identification (i.e., RB-id) is to be reused as the BEARER input parameter to the ciphering/encryption (e.g., a same RB-id is allocated to a new bearer). A similar problem results from situations where COUNT would wrap-up (for a same BEARER). In these situations, if the KEY (KeNB/S-KeNB) would remain the same, then it would lead to a repetition in the input parameters. Such a repetition in the input parameters to the ciphering/encryption represents a security hole that can be exploited. For example, RB-id reuse security hole can be exploited by an attacker quickly adding more and more application.

For ciphering and integrity a COUNT value is maintained which is shown in FIG. 11. The COUNT value is composed of a HFN and the PDCP sequence number, SN. The length of the PDCP SN is configured by upper layers. The PDCP SN is bearer specific which means that for each radio bearer, a separate PDCP SN is maintained. The size of the HFN part in bits is equal to 32 minus the length of the PDCP SN. COUNT wrap-up would happen when the number of PDCP PDUs transmitted exceeds the total length of COUNT.

Bearer (RB-id) reuse (same RB-id being allocated to a new bearer) could happen in the following situations: Firstly, a bearer release and later same RB-id (especially a DRB) being allocated to a different bearer. A DRB-id is the RB-id allocated to a Data Bearer (DRB). Secondly, when DRB-id space is wrapped, i.e., 29 DRBs in LTE (32–3 SRBs) were established and a new Bearer will need to use one of the already used DRB-id. A total of 32 Bearers can be configured to a UE in LTE out of which 3 bearers (and corresponding Ids) are reserved for Signaling, called Signaling Radio Bearer.

Since dual connectivity has not yet been standardized, the above discussed problems are new and there are no solutions available in specification. However, based on the principles in legacy (e.g., LTE Rel. 11 and before) an eNB avoids RB-id reuse as much as possible. However, there may be a point beyond which the situation (RB-id reuse or COUNT wrap-up) cannot be avoided anymore.

When avoiding is no more possible/is difficult, the MeNB may perform Intra-cell handover which changes the K$_{eNB}$ to be used in the MeNB (MCG) but further it is not clear how it will lead to refreshing of S-K$_{eNB}$. When/if the new K$_{eNB}$ is used to refresh the S-K$_{eNB}$, the MeNB bearers also get interrupted unnecessarily since the refresh of K$_{eNB}$ was only a means of refreshing S-K$_{eNB}$ but was not required otherwise (no RB-id reuse or COUNT wrap-up for the bearers being served by MeNB directly). Further, Intra-cell handover is quite expensive procedure since it involves some interruption of user data not only in SeNB but also in MeNB. Interruption of user data for MeNB only bearers is quite unnecessary/avoidable since this is mainly a security issue at the SeNB.

As a result of Intra-cell handover all the bearer(s) needs to be re-established and data forwarded between the network nodes, etc. So this is better avoided or optimized.

Dual Connectivity introduces more than one eNB to UE's connection, i.e., the UE consumes/utilizes resources from two eNBs. Both security protect the signaling and/or data towards the UE with their respective keys; MeNB with K$_{eNB}$ and SeNB with S-K$_{eNB}$.

BRIEF SUMMARY

One object of the disclosure is to provide an improved method for establishing a secure communication link between a master base station and a secondary base station in case of a detected security breach, thereby avoiding the problems of the prior art as identified above.

The object is solved by the subject matter of the independent claims. Advantageous embodiments are subject to the dependent claims.

It is assumed that the mobile station is in dual connectivity and thus connected to both a master base station and a secondary base station via respective communication links. As explained above, in dual connectivity the security key S-K$_{eNB}$ for the Secondary Cell Group, SCG, (i.e., for communication with the secondary base station) is inter-dependent on the security key K$_{eNB}$ for the Master Cell Group, MCG (i.e., for communication with the master base station).

In this respect, in case of the detection of a potential security breach, the network would trigger an intra-cell handover for all bearers of the master and the secondary cell group thereby re-establishing security for the communication with the master and the secondary base station.

According to a first aspect of the disclosure, in case of the detection of a potential security breach it is proposed to only re-establish security for the communication with the secondary base station and not with the master base station. For an independent re-establishment of security for the communication with the secondary base station, a new security key S-K$_{eNB}$ is derived on the basis of a incremented, hence, new COUNT input parameter to the ciphering/encryption algorithm (henceforth: freshness counter). In other words, the security key $K_{eNB}$ for the communication with the master base station can remain the same, such that no intra-cell handover becomes necessary.

Specifically, in response to a detected potential security breach, the master base station increments the freshness counter for re-initializing the communication between the mobile station and the secondary base station. The term re-initializing of communication shall, in the context of the disclosure, be understood as re-establishing the PDCP sub-layer, re-establishing the RLC sub-layer and resetting the MAC layer.

In this respect, the re-initializing of communication differs from the execution of a handover command in that it provides for an optimized routing of packet data units, namely since the C-RNTI does not change. More importantly, the re-initialization of communication is triggered by a different message, namely an RRC connection reconfiguration message which does not include a handover command (i.e., without mobility control information).

The re-initialization of the communication between the mobile station and the secondary base station is based on the incremented freshness counter in that a new security key $S$-$K_{eNB}$ is derived for the communication there between under the control of the master base station. In this respect, the mobile station and the secondary base station are capable of establishing the secure communication link, after detection of the potential security breach, using the same, derived security key $S$-$K_{eNB}$.

As the above procedure is so different from what is presently carried out upon detection of a potential security breach, independently from the above, the following suggested improving the re-establishment of security within a secondary cell group.

According to a second aspect of the disclosure, a mobile station (i.e., UE) is suggested, the mobile station being initialized for communication with a master and a secondary base station in a wireless communication system, wherein the mobile station receives from the master base station a reconfiguration message (for example an RRC connection reconfiguration message) which includes a freshness counter.

For clarification purposes only, it shall be emphasized that the reconfiguration message does not include a handover command.

In response to receipt of the reconfiguration message, the mobile station derives a security key $S$-$K_{eNB}$ for the communication with the secondary base station. More particularly, the mobile station derives the security key $S$-$K_{eNB}$ based on the incremented freshness counter included in the reconfiguration message.

The secondary key $S$-$K_{eNB}$, is subsequently used, by the mobile station, for re-initializing the communication with the secondary base station, thereby enabling the mobile station to establish a secure communication link with the secondary base station.

Notably, the reconfiguration message received from the master base station includes the incremented freshness counter. Accordingly, the mobile station can derive that it is to trigger re-initialization of the communication with the secondary base station. In other words, should the reconfiguration message not be for the communication with the secondary base station no incremented freshness counter would be included therein.

Advantageously, in case the mobile station receives the reconfiguration message in a ciphered form from the master base station, the mobile station may determine if it is also is provided with a current version of the security key $K_{eNB}$ on which, in addition to the incremented freshness counter, the derived security key for the communication with the secondary base station is based.

According to a first embodiment, in line with the first aspect of the disclosure, a method is proposed for establishing a secure communication link between a mobile station and a secondary base station in a mobile communication system. The mobile communication system comprises the mobile station, a master and the secondary base station. The mobile station is initialized for communication with the master and the secondary base station.

The master or the secondary base station detect a potential security breach including a condition where a sequence counter of packet data units of an established secure communication link between the mobile station and the secondary base station is to wrap-up since initialization of the communication between the mobile station and the secondary base station, and a condition where a communication link identification is to be reused for establishing the secure communication link with the secondary base station since initialization of the communication between the mobile station and the secondary base station.

In case the potential security breach is detected by the secondary base station, the secondary base station signals the detected security breach to the master base station. In response to the detected or signaled potential security breach, the master base station increments a freshness counter for re-initializing the communication between the mobile station and the secondary base station; and the mobile station and the secondary base station, re-initialize the communication there between. The re-initialization is performed under the control of the master base station and further includes deriving a same security key based on said incremented freshness counter, and establishing the secure communication link utilizing the same, derived security key.

According to a second embodiment, in line with the first aspect of the disclosure, a mobile communication system is suggested for establishing a secure communication link between a mobile station and a secondary base station. The mobile communication system comprises the mobile station, a master and the secondary base station. The mobile station is initialized for communication with the master and the secondary base station.

The master and/or the secondary base station are configured to detect a potential security breach including: a condition where a sequence counter of packet data units of an established secure communication link between the mobile station and the secondary base station is to wrap-up since initialization of the communication between the mobile station and the secondary base station, and a condition where a communication link identification is to be reused for establishing the secure communication link with the secondary base station since initialization of the communication between the mobile station and the secondary base station.

The secondary base station is configured to, in case of detecting the potential security breach, signal the detected security breach to the master base station; the master base station is configured to increment in response to the detected or signaled potential security breach, a freshness counter for re-initializing the communication between the mobile station and the secondary base station.

BRIEF DESCRIPTION OF THE SEVERAL VIEWS OF THE DRAWINGS

In the following the disclosure is described in more detail with reference to the attached figures and drawings.

DETAILED DESCRIPTION

Figure 1:
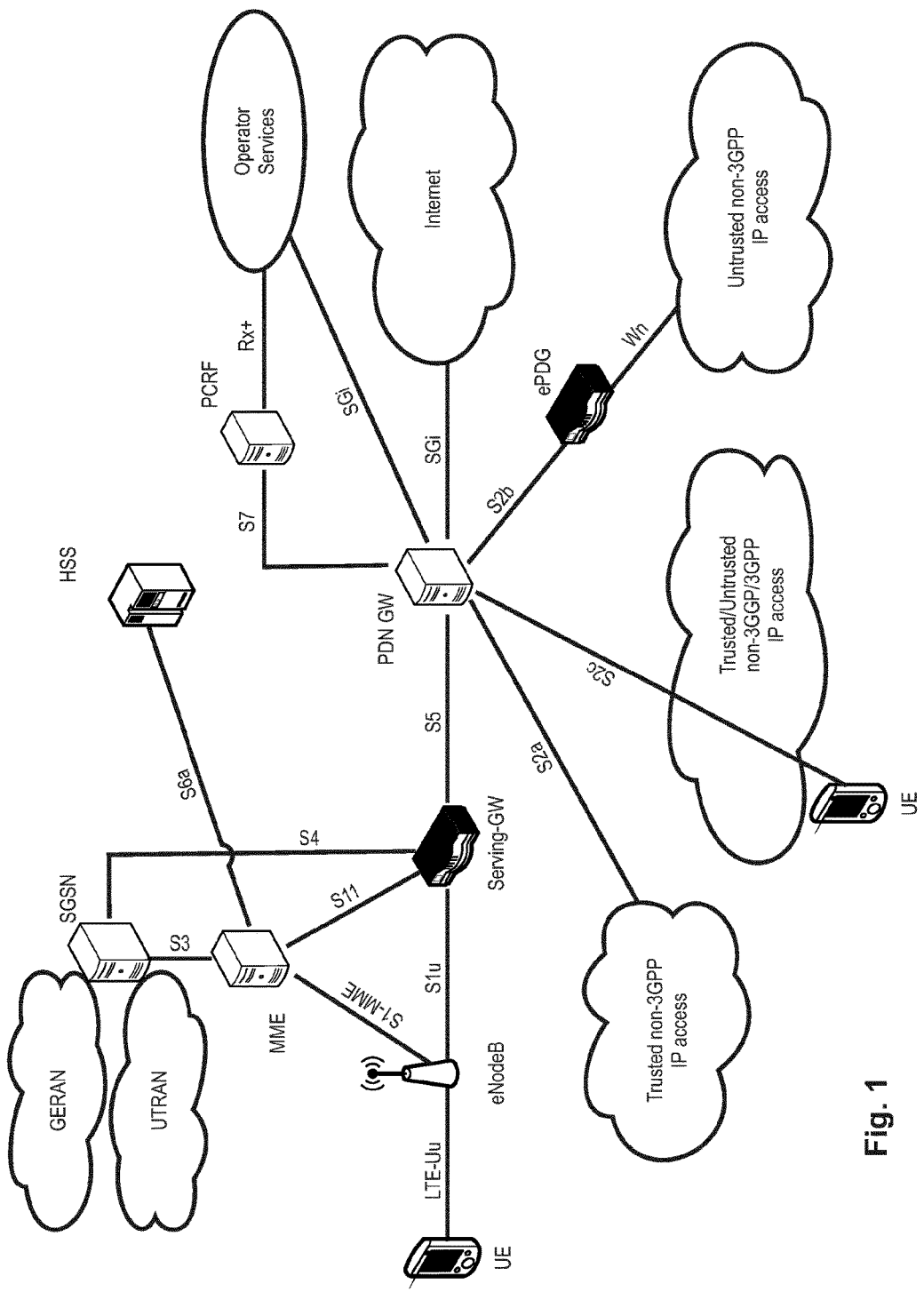
FIG. 1 shows an exemplary architecture of a 3GPP LTE system.
Figure 2:
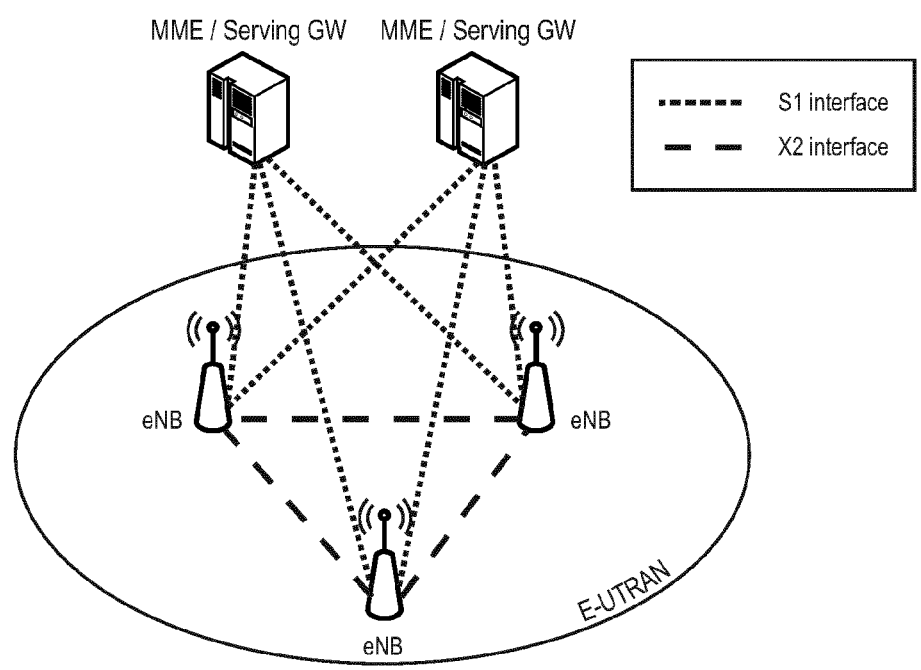
FIG. 2 shows an exemplary overview of the overall E-UTRAN architecture of 3GPP LTE.
Figure 3:
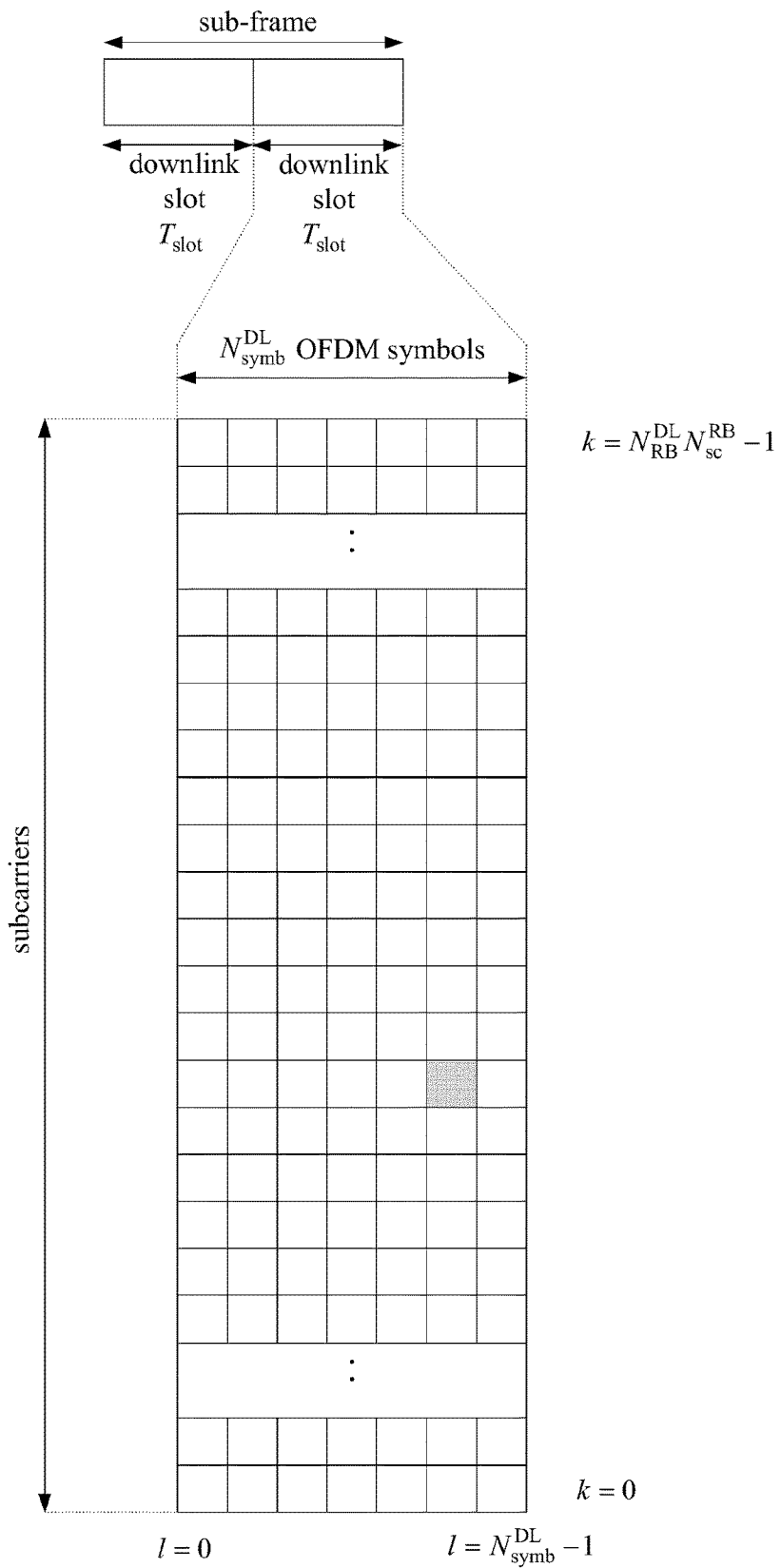
FIG. 3 shows exemplary sub-frame boundaries on a downlink component carrier as defined for 3GPP LTE (Release 8/9)
Figure 4:
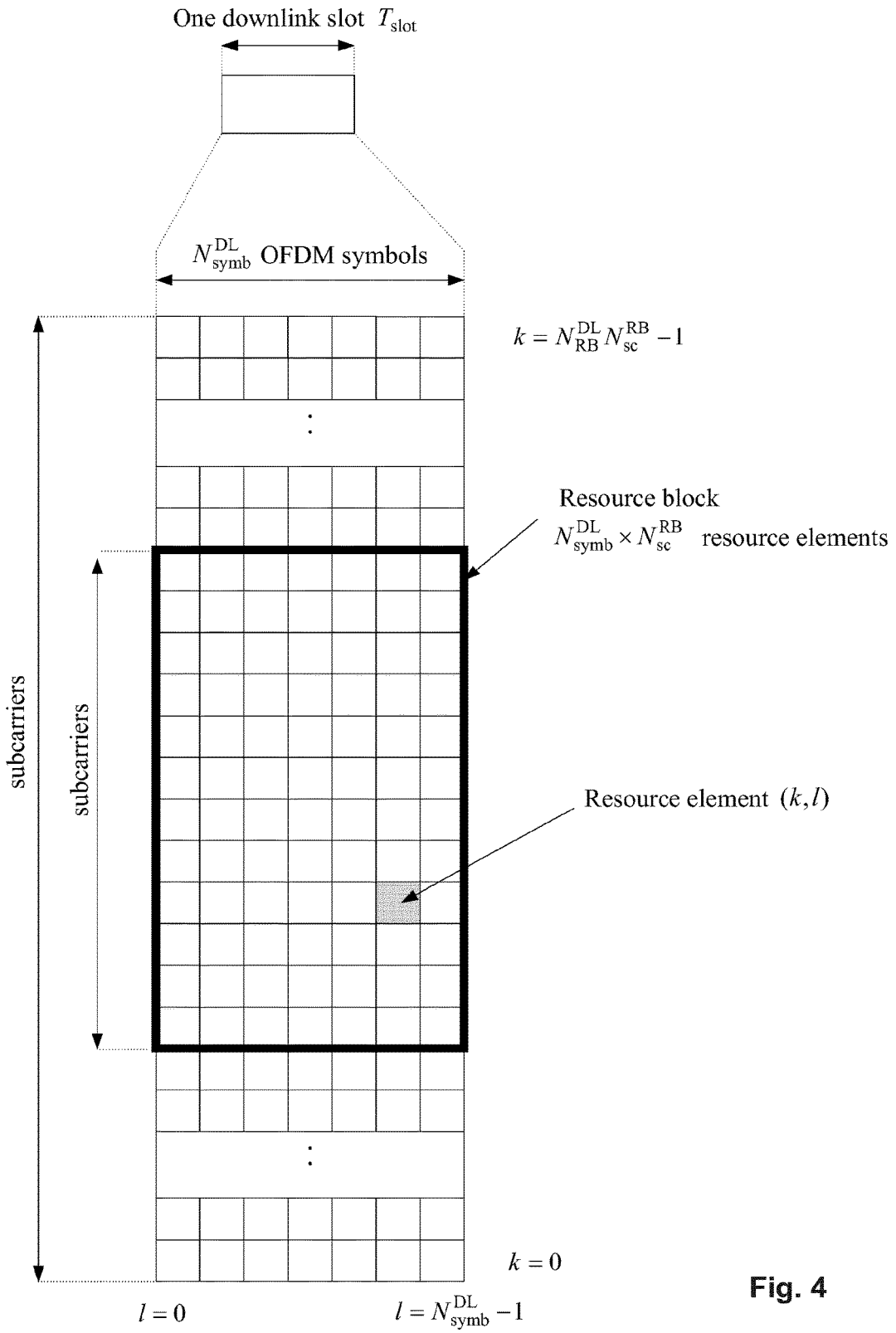
FIG. 4 shows an exemplary downlink resource grid of a downlink slot as defined for 3GPP LTE (Release 8/9)
Figure 5:
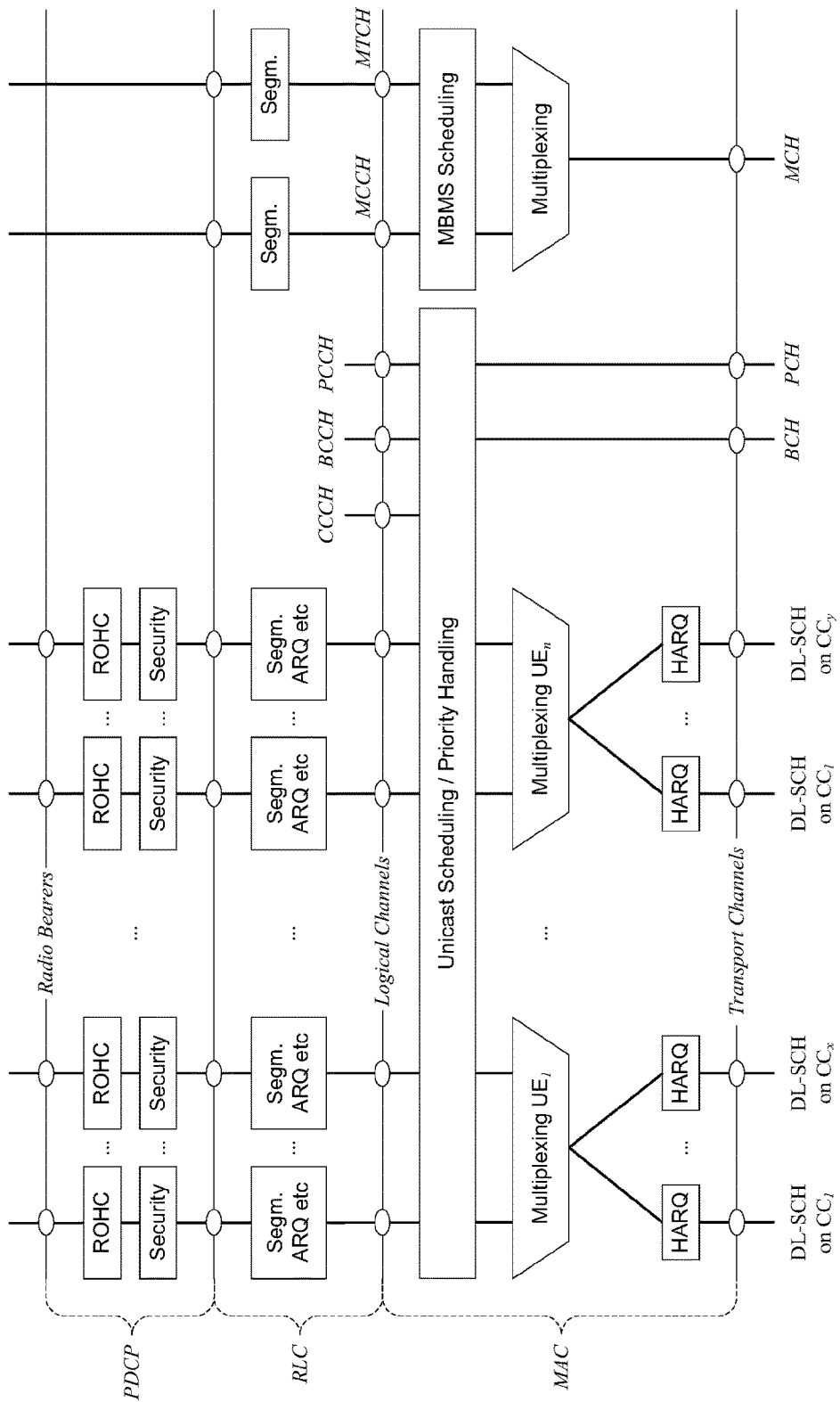
FIGS. 5 and 6 show the Layer 2 structure in 3GPP LTE (Release 10) with activated carrier aggregation for the downlink and uplink, respectively, FIG. 7 details the architecture of a mobile communication system in dual connectivity with macro and small eNBs connected to the core network in 3GPP LTE (Release 11), FIG. 8 gives an overview of the security architecture in 3GPP LTE (Release 12), FIG. 9 details the security key architecture in 3GPP LTE (Release 12)
Figure 6:
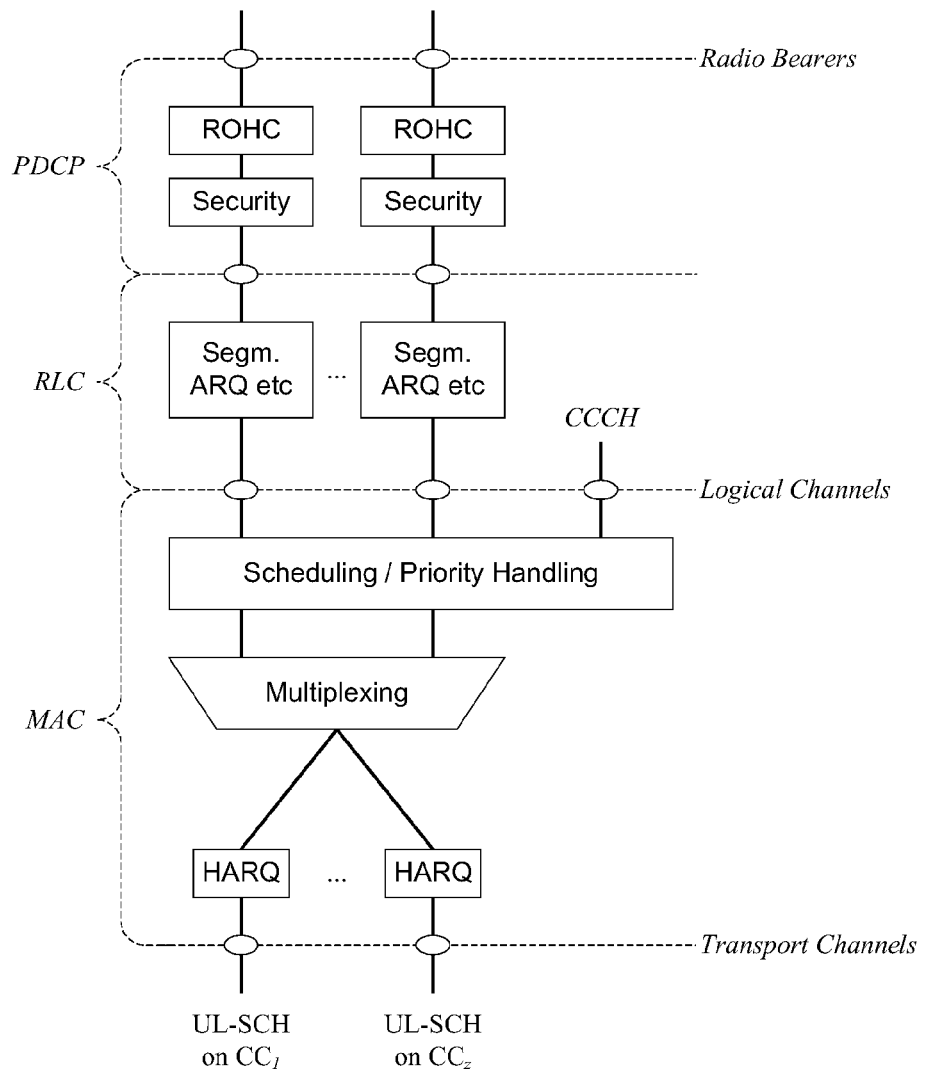
Figure 7:
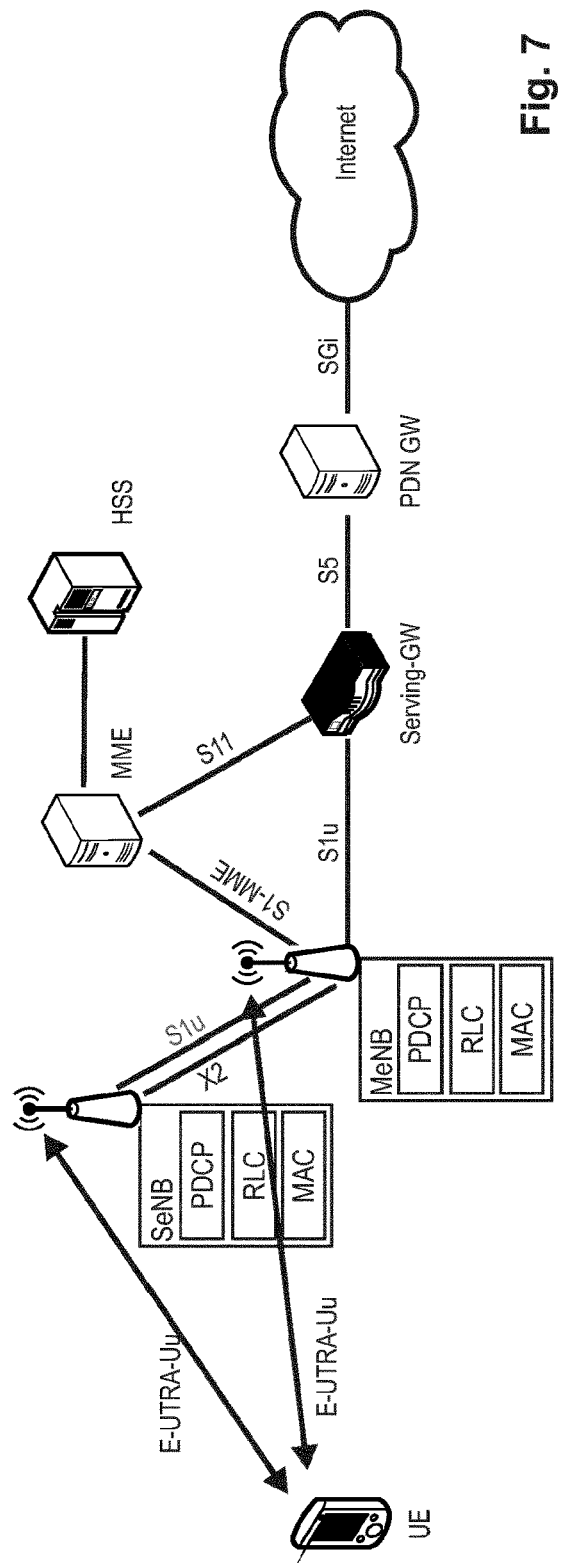
Figure 8:
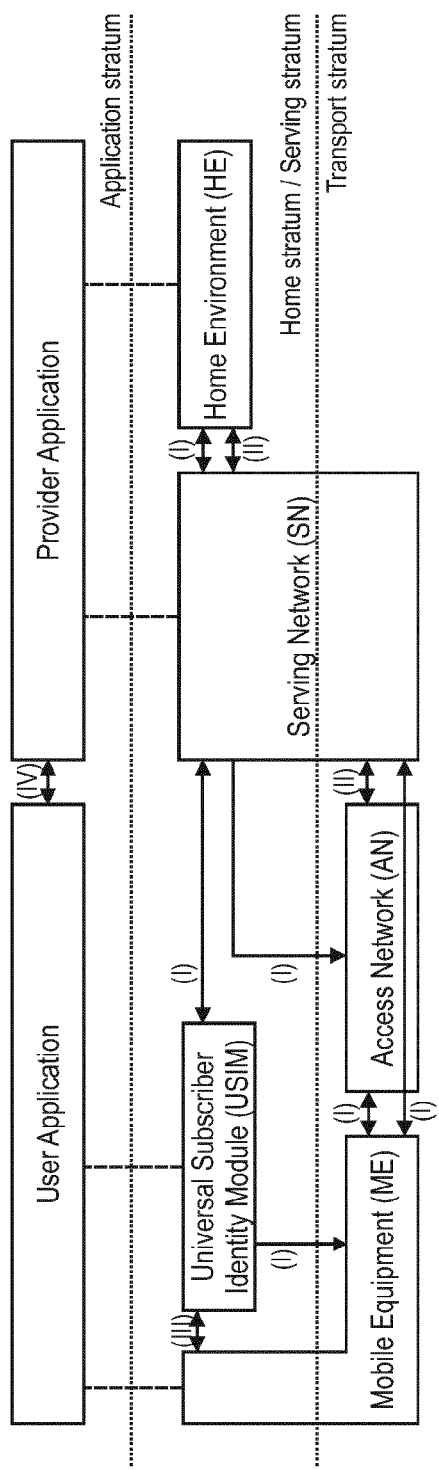
Figure 9:
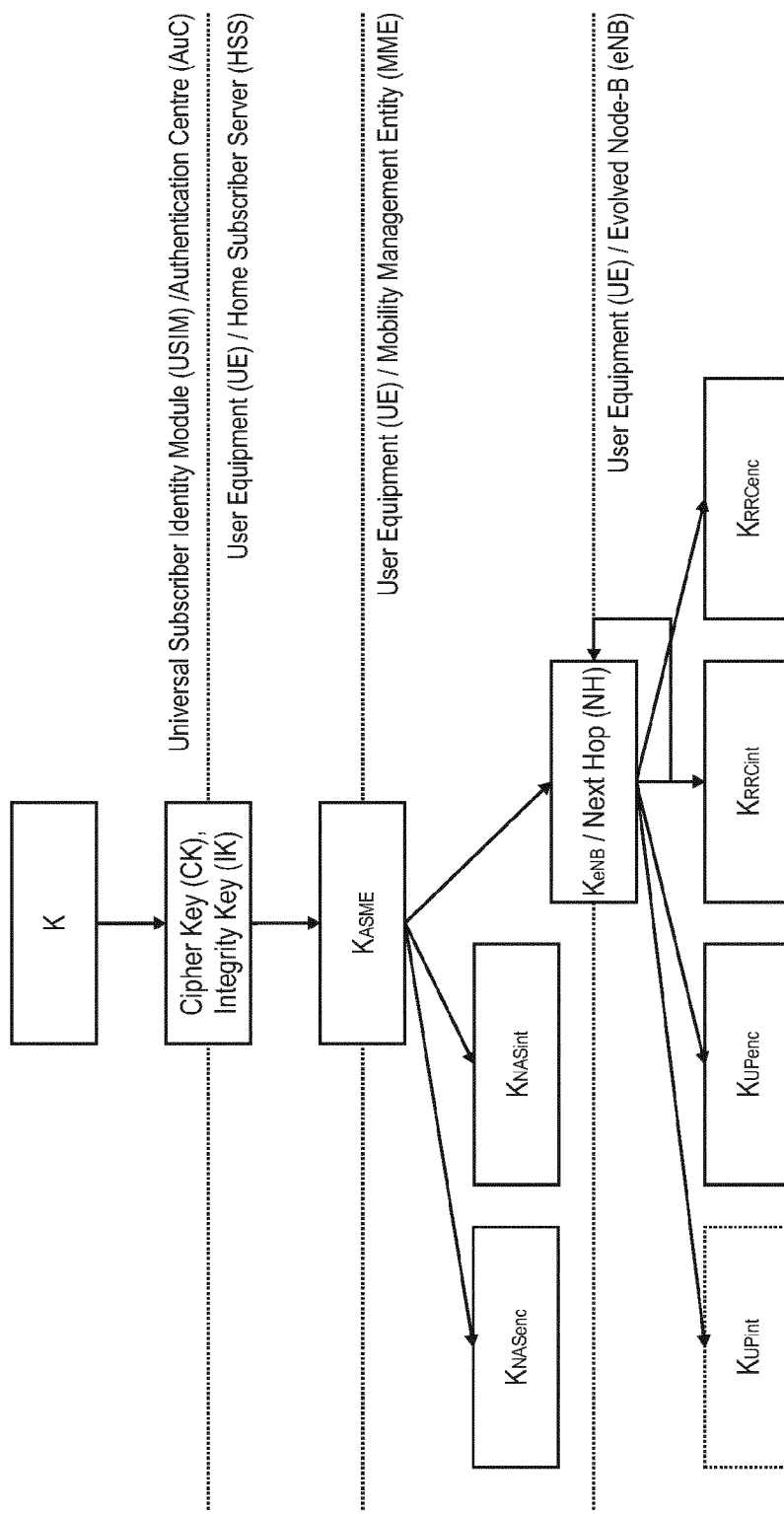
Figure 10:
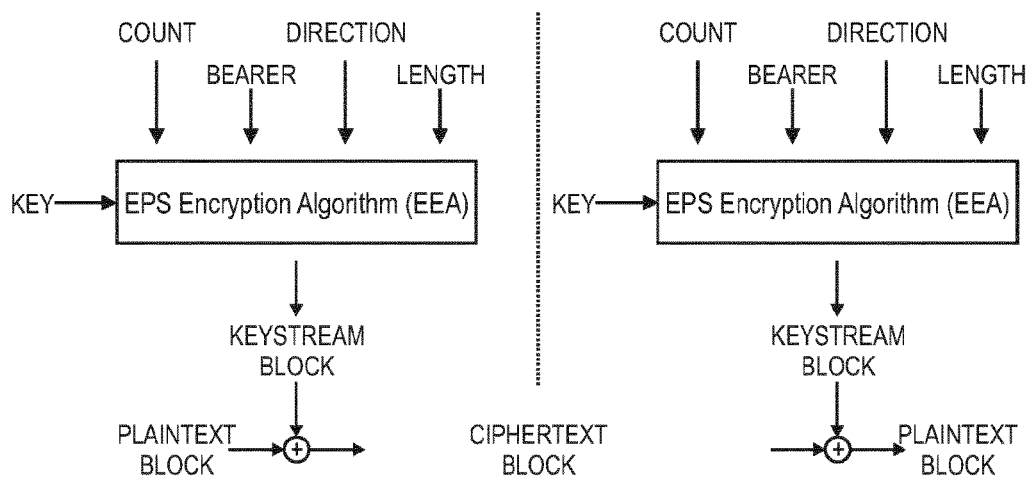
FIG. 10 illustrates the ciphering/encryption algorithm in 3GPP LTE (Release 12)

A mobile station or mobile node is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over it may communicate with other functional entities or correspondent nodes.

The term "master base station" used in the claims and throughout the description of the disclosure is to be construed as used in the field of dual connectivity of 3GPP LTE-A; thus, other terms are macro base station, or master/macro eNB; or serving base station or any other terminology to be decided later by 3GPP. Similarly, the term "secondary base station" used in the claims and throughout the description is to be construed as used in the field of dual connectivity of 3GPP LTE-A; thus, other terms are slave base station, or secondary/slave eNB or any other terminology to be decided later by 3GPP.

The term "radio link" or "communication link" used in the claims and throughout the description of the disclosure is to be understood in a broad way as the radio connection between the mobile station and a base station including the master base station or the secondary base station.

Further, the term of "initializing" or "re-initializing" used in the claims and throughout the description of the disclosure is to be understood as including the (re-) establishment of the Radio Link Control, RLC, sub-layer, the (re-)establishment of the Packet Data Convergence Protocol, PDCP sub-layer, and the setup (reset) of the Medium Access Control, MAC, layer, respectively. In this respect, service data units, SDUs, and/or packet data units, PDUs, which were not successfully transmitted prior to the re-initialization will be transmitted in compliance with re-initialized communication thereby enforcing network access security.

In the following, several embodiments of the disclosure will be explained in detail. For exemplary purposes only, most of the embodiments are outlined in relation to a radio access scheme according to 3GPP LTE (Release 8/9) and LTE-A (Release 10/11) mobile communication systems, partly discussed in the Technical Background section above. It should be noted that the disclosure may be advantageously used for example in a mobile communication system such as 3GPP LTE-A (Release 12) communication systems as described in the Technical Background section above. These embodiments are described as implementations for use in connection with and/or for enhancement of functionality specified in 3GPP LTE and/or LTE-A. In this respect, the terminology of 3GPP LTE and/or LTE-A is employed throughout the description. Further, exemplary configurations are explored to detail the full breadth of the disclosure.

The explanations should not be understood as limiting the disclosure, but as a mere example of the disclosure's embodiments to better understand the disclosure. A skilled person should be aware that the general principles of the disclosure as laid out in the claims can be applied to different scenarios and in ways that are not explicitly described herein. Correspondingly, the following scenarios assumed for explanatory purposes of the various embodiments shall not limit the disclosure as such.

The disclosure will be described with reference to FIGS. 13 to 16. In the following, a dual connectivity scenario in a small cell environment is assumed for the wireless communication system. In this respect, the mobile station is connected to both a master base station and a secondary base station respectively via a first and secondary communication link. It should be noted however that the disclosure is not restricted to this scenario; for instance, scenarios where the mobile station is connected to a master base station and at least two secondary base stations are also possible.

In more detail, the mobile station is initialized for communication with the master base station and the secondary base station. In this respect, the mobile station is configured with a RLC sub-layer and a PDCP sub-layer for communication with the respective master base station and the secondary base station. In view of security aspects, the initialization for communication also means that the mobile station is provided with security keys which allow the mobile station to establish secure communication links to the master and the secondary base station.

Specifically, the initialization of the mobile station prescribes that a security key $K_{eNB}$ is provided to, more specifically derived by, the mobile station for establishing a secure communication link with the master base station. From an implementation point of view, the security key $K_{eNB}$ may be used by the mobile station to derive further security keys for specific purposes, namely for ciphering or for integrity. In this context, the technical background section lists the $K_{UPint}$, the $K_{UPenc}$, the $K_{RRCint}$, and the $K_{RRCenc}$. Irrespective thereof, the mobile station is enabled to enforce security upon a communication link with the master base station.

Similarly, the initialization of the mobile station prescribes that also a security key $S-K_{eNB}$ is provided to, more specifically derived by, the mobile station for the communication with the secondary base station. Specifically, this security key $S-K_{eNB}$ is derived from the security key $K_{eNB}$ for the communication with the master base station and an additional parameter named freshness counter. In other words, on the basis of the security key $K_{eNB}$ and the freshness counter, the mobile station is capable of deriving security key $S\text{-}K_{eNB}$ thereby allowed to enforce security upon a communication link with the secondary base station.

With respect to the communication between the mobile station and the master base station, a potential security breach may be detected. Among various conditions, it becomes readily apparent that a potential security breach results from situations where the ciphering/encryption algorithm is provided with repeating input parameters.

In the context of the disclosure, a potential security breach includes a condition where a sequence counter of packet data units, PDUs, of an established secure communication link is about to wrap-up (i.e., exceeds a predefined threshold related to the maximum number of the sequence counter) or actually wraps-up (i.e., exceeds the maximum number of the sequence counter) since initialization of the communication between the mobile station and the secondary base station. In other words, in case of the sequence counter relating to an established secure communication link wrap-ups, same communication link is no longer secure because the sequence number(s) has(have) to be reused.

Figure 11:
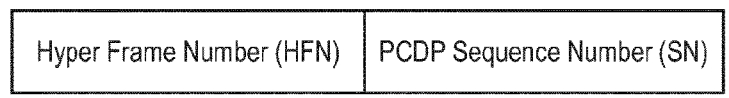
FIG. 11 shows the format of COUNT being an input parameter to the ciphering/encryption algorithm in 3GPP LTE (Release 11)
Figure 12:
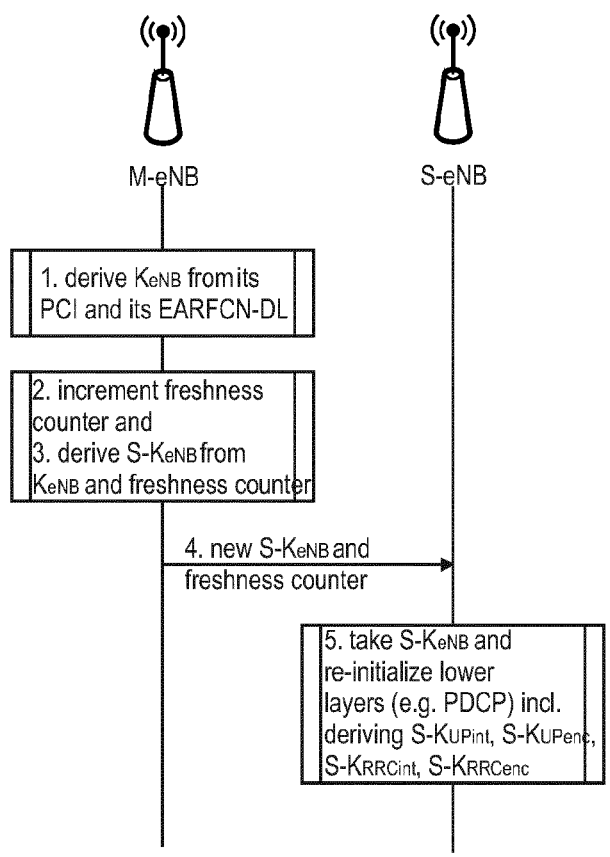
FIG. 12 illustrates the security key derivation in a wireless communication system in dual connectivity in 3GPP LTE (Release 12)

More particularly, the sequence counter of PDUs, on the basis of which the COUNT parameter is formed by the PDCP sequence number and the Hyper Frame Number, HFN as shown in FIG. 11, is an input to the ciphering/encryption algorithm. Accordingly, a repetition of the sequence number of PDUs would result in a potential security breach. Consequently, such a potential security breach is detectable by way of detecting a condition where the sequence counter of PDUs wraps-up since initialization.

In the context of the disclosure, a potential security breach also includes the condition where the communication link identification, more particularly, the resource bearer identification RB-id, is to be reused (i.e., previously unused communication link identifications are no longer available) since initialization of the communication between the mobile station and the secondary base station. The reuse of a communication link identification may result from establishing a new secure communication link. In other words, in case the plurality of available communication link identifications is already used up, establishment of a further communication link is not secure since it involves reusing a communication link identification.

More particularly, the communication link identification (i.e., RB-id) in form of the parameter BEARER is a further input to the ciphering/encryption algorithm such that repetition thereof would also result in a potential security breach. Consequently, such a potential security breach is detectable by way of detecting a condition where the communication link identification is to be reused since initialization.

In more general, the above discussed potential security breach relate to an initialized communication between the mobile station and the secondary base station only. In this respect, should the communication between the mobile station and the secondary base station be re-initialized, the detection of conditions which result in a potential security breach start anew. Consequently, the conditions of a sequence counter wrap-up or of a communication link identification reuse are only decisive if they occur since initialization of the communication between the mobile station and the secondary base station.

According to a more particular embodiment, the condition where the sequence counter of PDUs is about to wrap-up is detected by the secondary base station. Specifically, this secondary base station is provided for integrity reasons with a sequence counter for PDUs as part of the communication with the mobile station. Consequently, the secondary base station may detect, since initial of the communication with the mobile station, the sequence counter is about to wrap-up.

In another more particular embodiment, of the condition where the communication link identification is about to be reused may either be detected by the master base station or the secondary base station. Since the dual connectivity scenario requires both, the master and the secondary base station to be informed of the establishment of a new secure communication link between the mobile station and the secondary base station, both base stations may monitor the communication link identification assignment and, specifically, the reuse thereof since initialization.

Should a potential security breach be detected by the secondary base station, same secondary base station signals the detected security breach to the master base station. Alternatively, should a potential security breach be detected by the master base station, no signaling to the master base station is required.

In response to the signaled or detected potential security breach, the master base station averts same potential security breach by triggers re-initialization of the communication between the mobile station and the secondary base station. In particular, for this purpose, the master base station increments the freshness counter on which the security key $S\text{-}K_{eNB}$ for the communication between the mobile station and the base station is based.

Then, the mobile station and the secondary base station re-initialize the communication between each other under the control of the master base station, namely by the mobile station and the secondary base station, deriving a same security key $S\text{-}K_{eNB}$ on the basis of the incremented freshness counter. In particular, the master base station controls derivation of the same security key $S\text{-}K_{eNB}$ by providing the incremented freshness counter to the mobile station and to the secondary base station.

Consequently, having re-initialized the communication the mobile station and secondary base station are capable of establishing a secure communication link between each other utilizing the same, derived security key $S\text{-}K_{eNB}$.

Advantageously, in this embodiment the communication between the mobile station and the secondary base station re-initialized without having re-initialized the communication between the mobile station and the master base station. In other words, for the communication between the mobile station and the secondary base station a same secure key $S\text{-}K_{eNB}$ is derived which bases on a incremented, hence different, freshness counter and thereby enables establishing a secure communication link there between without requiring re-initialization of the communication with the master base station, inherently requiring derivation of a corresponding security key $K_{eNB}$.

First Example of a More Detailed Embodiment of the Disclosure

Figure 13:
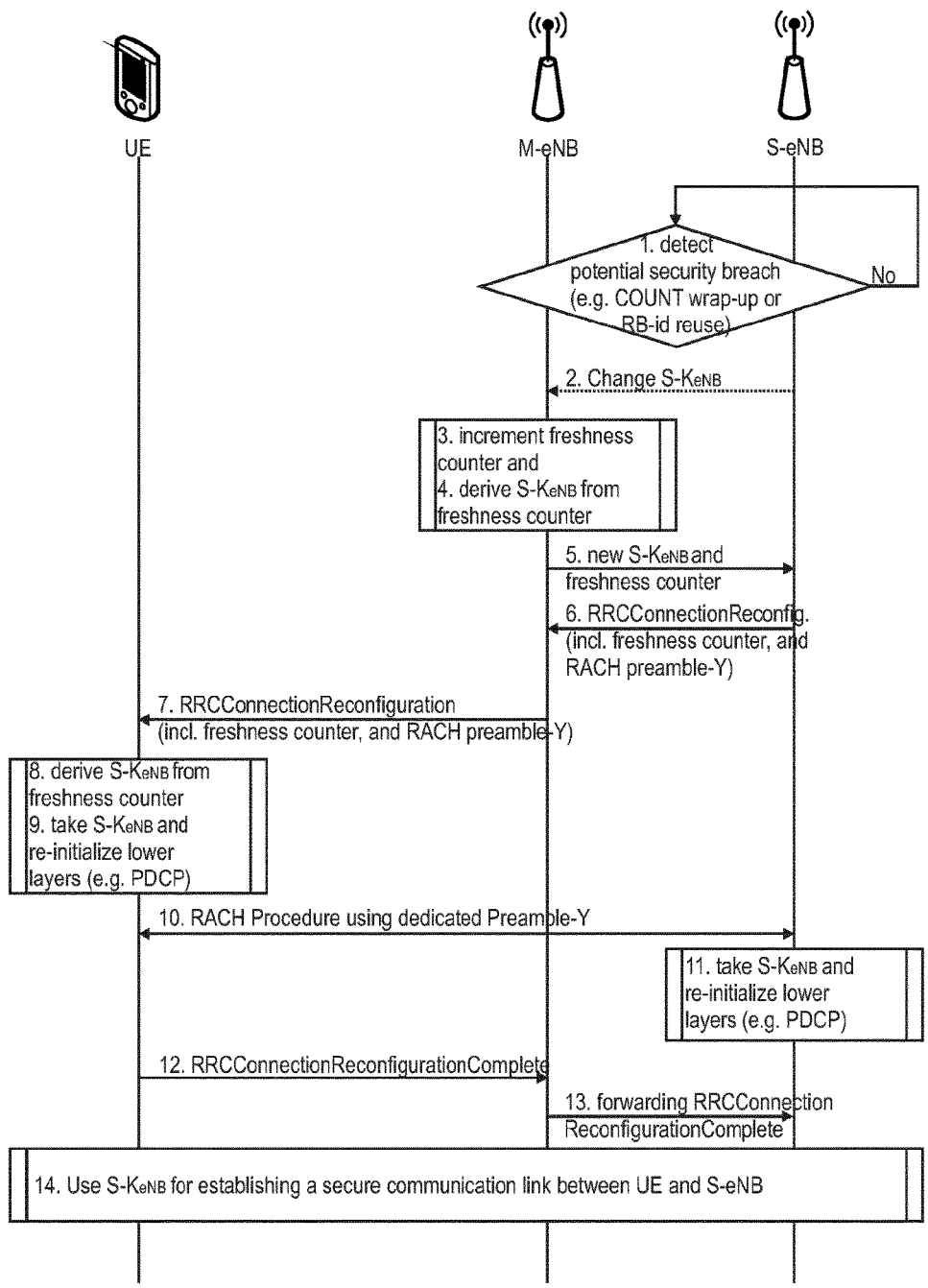
FIGS. 13-16 illustrates the security key derivation according to various embodiments of the disclosure.

Referring now to FIG. 13 wherein a first example of a more detailed embodiment of the disclosure is shown. This embodiment illustrates a method for establishing a secure communication link between a mobile station and a secondary base station in a mobile communication system employing dual connectivity. Accordingly, the mobile communication system comprises a master and a secondary base station. The mobile station is initialized for communicating with the master base station and the secondary base station.

Supposing that the communication between the mobile station and the master and the secondary base station is respectively initialized, either the master or the secondary base station perform, in step 1, the operation of detecting a potential security breach. As discussed above, the potential security breach may be detected as a condition where a sequence counter of PDUs is about to wrap-up or where a communication link identification is to be reused since initialization of the communication between the mobile station and the secondary base station.

In case the secondary base station detects, for example, the condition where a sequence counter of packet data units of an established secure communication link between the mobile station and the secondary base station is about to wrap-up or actually wraps-up, same secondary base station signals, in step 2, the detected security breach to the master base station. Since in an alternative case, the master base station may equally detect a security breach, the signaling of the detected security breach is indicated as being optional by way of a dashed line.

Signaling of the detected security breach by the secondary base station to the master base station may correspond to a message requesting the change of the security key S-$K_{eNB}$ on which the communication between mobile station and the secondary base station is based.

In response to the detected or signaled security breach, the master base station increments, in step 3, a freshness counter maintained for the communication between the mobile station and the secondary base station. This freshness counter is for re-initializing the communication between the mobile station and the secondary base station in that it allows enforcing network access security there between.

Subsequently, the master base station, in step 4, derives on the basis of the incremented freshness counter a new security key S-$K_{eNB}$ for the communication between the mobile station and the secondary base station. As discussed in the description above, the derivation of the security key S-$K_{eNB}$ is not only based on the incremented freshness counter but also on the security key $K_{eNB}$ for the communication between the mobile station and the master base station which is also available to both communication partners.

Advantageously, the present embodiment dispenses with the need for the master base station to re-initialize this communication between the mobile station and the master base station, and, hence, with the need for the master base station to derive a new security key $K_{eNB}$ therefore.

Having derived the new security key S-$K_{eNB}$ for the communication between the mobile station and the secondary base station, the master base station transmits, in step 5, this newly derived security key S-$K_{eNB}$ and the incremented freshness to the secondary base station. From an implementation side, the transmission of the newly derived security key S-$K_{eNB}$ and the incremented freshness counter may be effected utilizing the X2 interface.

Subsequently, the secondary base station generates, in step 6, a reconfiguration message including the incremented freshness counter for re-initializing the communication between the mobile station and the secondary base station. The secondary base station then transmits same message to the master base station. From an implementation side, the transmission of the reconfiguration message may be effected utilizing the X2 interface.

In an implementation of the present embodiment, the reconfiguration message is an RRC connection reconfiguration message and includes additional information commonly included in the message. In particular, the RRC connection reconfiguration message additionally includes a dedicated Random Access CHannel, RACH, preamble. For illustrative purposes, the dedicated RACH preamble is titled RACH preamble-Y.

The reconfiguration message, generated by the secondary base station, is then forwarded, in step 7, by the master base station to the mobile station. Even though the reconfiguration message is received from the master base station, the mobile station can identify from its content that it is generated by and, hence, is linked to (i.e., related to) the communication with the secondary base station and not to the communication with the master base station.

The skilled reader can readily appreciate from the discussion above, that the reconfiguration message forwarded by the master base station to the mobile station is ciphered by the master base station using the security key $K_{eNB}$ for communication between each other. In this respect, security can be enforced for the transmission of the incremented freshness counter without adding implementation complexity, simply due to the fact that that the present embodiment dispenses with the need for re-initializing the communication between the mobile station and the master base station.

In the context of the disclosure, the reception of this reconfiguration message by the mobile station may be understood as a trigger for the mobile station to perform re-initialization of the communication with the secondary base station.

Accordingly, the mobile station derives, in step 8, a security key S-$K_{eNB}$ for the communication with the secondary base station on the basis of the freshness counter included in the forwarded reconfiguration message. This security key S-$K_{eNB}$, which is derived by the mobile station, is same to the security key S-$K_{eNB}$ derived in step 4 by the master base station and transmitted in step 5 to the secondary base station.

Consequently, since both, the mobile station and the secondary base station are provided with the same, derived security key S-$K_{eNB}$, a secure communication link can be established on the basis of this security key S-$K_{eNB}$ between the mobile station and the secondary base station.

In a variation of step 8, the mobile station first determines whether the incremented freshness counter, included in the transmitted reconfiguration message, differs from a previous freshness counter included in a previously transmitted reconfiguration message, and only in case of a different, incremented freshness counter, the mobile station derives the same security key S-$K_{eNB}$.

Subsequently, the mobile station re-initializes, in step 9, the communication with the secondary base station on the basis of the derived, same security key (cf. step 8) for the communication between the mobile station and the secondary base station. From the implementation side, the re-initialization performed by the mobile station may include re-establishing the PDCP sub-layer, re-establishing the RLC sub-layer and resetting the MAC layer.

Further to the implementation of the present embodiment where the reconfiguration message, being a RRC connection reconfiguration message, includes dedicated RACH preamble-Y, this dedicated RACH preamble-Y is subsequently utilized for performing, in step 10, a RACH procedure between the mobile station and the secondary base station.

Advantageously, the RACH procedure between the mobile station and the secondary base station not only updates the timing advance for communication there between but also may be understood, in the context of the disclosure, as a trigger for the secondary base station to perform re-initialization of the communication with the mobile station.

In this respect, the secondary base station re-initializes, in step 11, the communication with the mobile station on the basis of the derived, same security key (cf. step 4 and 5) for the communication between the mobile station and the secondary base station. From the implementation side, the re-initialization performed by the mobile station may include re-establishing the PDCP sub-layer, re-establishing the RLC sub-layer and resetting the MAC layer.

Subsequently, the mobile station transmits, in step 12, a reconfiguration complete message to the master base station which, in step 13, is forwarded by the master base station to the secondary base station. Particularly, in the present embodiment, the reconfiguration complete message is transmitted by the mobile station after the mobile station and the secondary base station have both re-initialized the communication there between.

This may be achieved, for example, by the mobile station deferring the transmission of the reconfiguration complete message to the master base station by a predetermined time interval. Alternatively, the mobile station may also assume that the secondary base station re-initializes in step 10 its connection faster than the transmission and the forwarding of the reconfiguration complete message in steps 12 and 13 and may immediately transmit same message after completion of the RACH procedure in step 10.

The skilled reader can readily appreciate from the discussion above, that the reconfiguration complete message, forwarded by the mobile station to the master base station, is ciphered by the mobile station using the security key $K_{eNB}$ for communication between each other. In this respect, security can be enforced also for the transmission of this reconfiguration complete message. From an implementation side, the transmission of the reconfiguration complete message between the base stations in step 13 may be effected via the X2 interface.

Even further to the implementation of the present embodiment, in response to the reconfiguration message, being a RRC connection reconfiguration message, the reconfiguration complete message is an RRC connection reconfiguration complete message.

Consequently, having re-initialized the communication in steps 9 and 11, the mobile station and secondary base station are capable of establishing a secure communication link between each other utilizing the same, derived security key $S-K_{eNB}$.

Advantageously, also in the present embodiment the communication between the mobile station and the secondary base station re-initialized without having to re-initialize the communication between the mobile station and the master base station. In other words, for the communication between the mobile station and the secondary base station a same secure key $S-K_{eNB}$ is derived which bases on a incremented, hence different, freshness counter and thereby enables establishing a secure communication link there between without requiring re-initialization of the communication with the master base station, inherently requiring derivation of a corresponding security key $K_{eNB}$.

Second Example of a More Detailed Embodiment of the Disclosure

Figure 14:
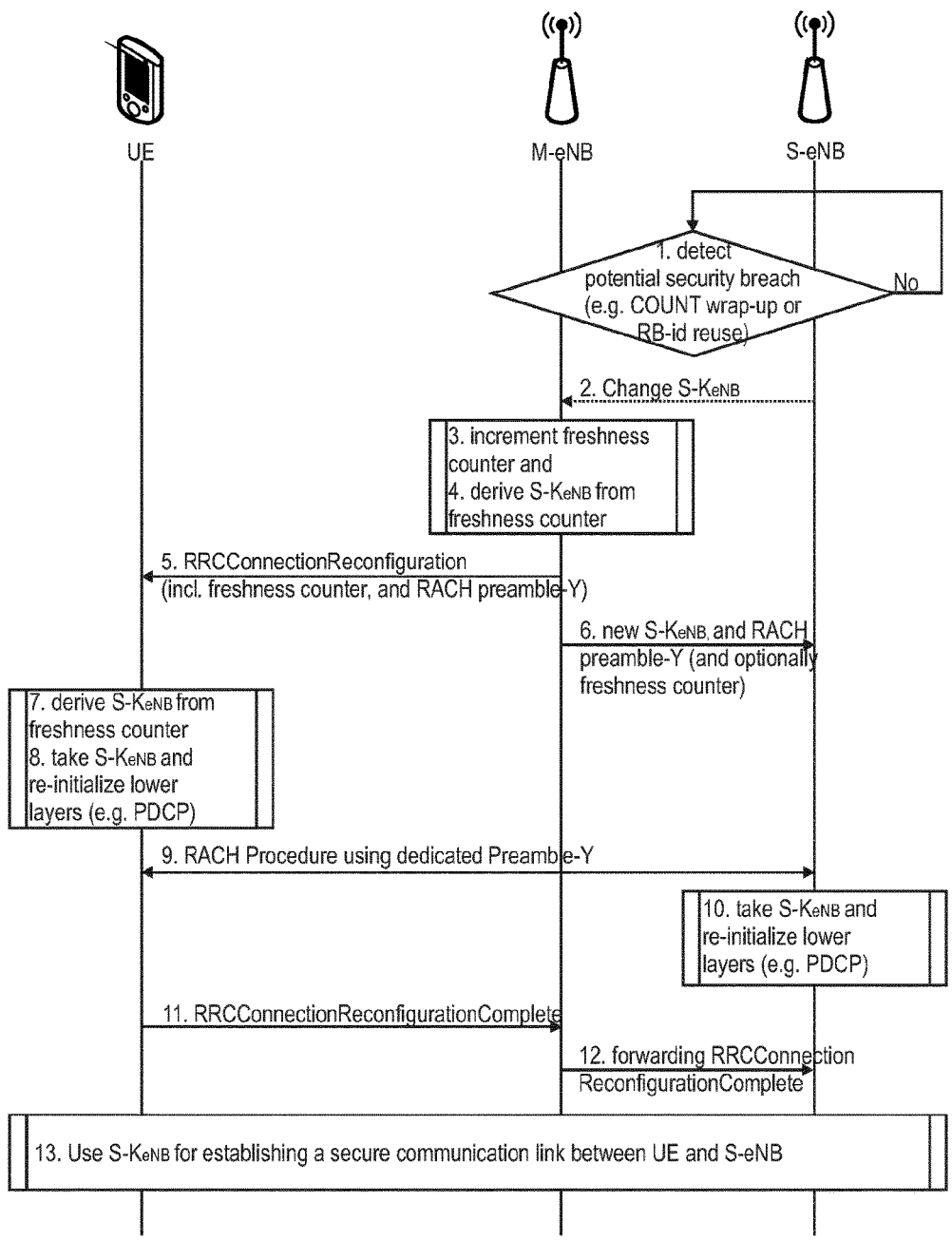

Referring now to FIG. 14 wherein a second example of a more detailed embodiment of the disclosure is shown. This embodiment also illustrates a method for establishing a secure communication link between a mobile station and a secondary base station in a mobile communication system employing dual connectivity. Accordingly, the mobile communication system comprises a master and a secondary base station. The mobile station is initialized for communicating with the master base station and the secondary base station.

In contrast to the first example of a more detailed embodiment, in the present embodiment the reconfiguration message including the freshness counter is generated and transmitted directly by the master base station to the mobile station and does not require generating and transmitting same reconfiguration message by the secondary base station and subsequently forwarding it by the master base station to the mobile station. Accordingly, the present embodiment results in an overall quicker secure communication link establishment between the mobile station and the secondary base station because the reconfiguration message is only transmitted once instead of twice.

Supposing that the communication between the mobile station and the master and the secondary base station is respectively initialized, either the master or the secondary base station perform, in step 1, the operation of detecting a potential security breach. As discussed above, the potential security breach may be detected as a condition where a sequence counter of PDUs is about to wrap-up or where a communication link identification is to be reused since initialization of the communication between the mobile station and the secondary base station.

In case the secondary base station detects, for example, the condition where a sequence counter of packet data units of an established secure communication link between the mobile station and the secondary base station is about to wrap-up or actually wraps-up, same secondary base station signals, in step 2, the detected security breach to the master base station. Since in an alternative case, the master base station may equally detect a security breach, the signaling of the detected security breach is indicated as being optional by way of a dashed line.

Signaling of the detected security breach by the secondary base station to the master base station may correspond to a message requesting the change of the security key $S-K_{eNB}$ on which the communication between mobile station and the secondary base station is based.

In response to the detected or signaled security breach, the master base station increments, in step 3, a freshness counter maintained for the communication between the mobile station and the secondary base station. This freshness counter is for re-initializing the communication between the mobile station and the secondary base station in that it allows enforcing network access security there between.

Subsequently, the master base station, in step 4, derives on the basis of the incremented freshness counter a new security key $S-K_{eNB}$ for the communication between the mobile station and the secondary base station. As discussed in the description above, the derivation of the security key $S-K_{eNB}$ is not only based on the incremented freshness counter but also on the security key $K_{eNB}$ for the communication between the mobile station and the master base station which is also available to both communication partners.

Advantageously, the present embodiment dispenses with the need for the master base station to re-initialize this communication between the mobile station and the master base station, and, hence, with the need for the master base station to derive a new security key $K_{eNB}$ therefore.

Having derived the new security key $S-K_{eNB}$ for the communication between the mobile station and the secondary base station, the master base station generates, in step 5, a reconfiguration message including the incremented freshness counter for re-initializing the communication between the mobile station and the secondary base station. The master base station then transmits same message to the mobile station.

In the present embodiment, the mobile station, receiving the reconfiguration message including the incremented freshness counter, link this message to the communication with the secondary base station due to the mere fact that it includes the freshness counter. A reconfiguration message for re-configuring the communication with the master base station does not included a freshness counter. In this respect, the mobile station can identify from the message's content that it is linked to (i.e., related to) the communication with the secondary base station and not to the communication with the master base station.

In an implementation of the present embodiment, the reconfiguration message is an RRC connection reconfiguration message and includes additional information commonly included in the message. In particular, the RRC connection reconfiguration message additionally includes a dedicated Random Access CHannel, RACH, preamble. For illustrative purposes, the dedicated RACH preamble is titled RACH preamble-Y.

Subsequently, the master base station transmits, in step 6, the newly derived security key S-$K_{eNB}$ and the incremented freshness counter to the secondary base station. From an implementation side, the transmission of the newly derived security key S-$K_{eNB}$ and the incremented freshness counter may be effected utilizing the X2 interface.

The skilled reader can readily appreciate from the discussion above, that the reconfiguration message transmitted by the master base station to the mobile station is ciphered by the master base station using the security key $K_{eNB}$ for communication between each other. In this respect, security can be enforced for the transmission of the incremented freshness counter without adding implementation complexity, simply due to the fact that that the present embodiment dispenses with the need for re-initializing the communication between the mobile station and the master base station.

Furthermore, from the description above, it becomes apparent that the steps 5 and 6 may also be carried out by the master base station in reversed order, namely that the reconfiguration message including the incremented freshness counter is transmitted (cf. step 5) to the mobile station after, and not before transmitting (cf. step 6) the newly derived security key S-$K_{eNB}$ and the incremented freshness counter to the secondary base station.

In the context of the disclosure, the reception of this reconfiguration message by the mobile station may be understood as a trigger for the mobile station to perform re-initialization of the communication with the secondary base station.

Accordingly, the mobile station derives, in step 7, a security key S-$K_{eNB}$ for the communication with the secondary base station on the basis of the freshness counter included in the forwarded reconfiguration message. This security key S-$K_{eNB}$, which is derived by the mobile station, is same to the security key S-$K_{eNB}$ derived in step 4 by the master base station and transmitted in step 6 to the secondary base station.

Consequently, since both, the mobile station and the secondary base station are provided with the same, derived security key S-$K_{eNB}$, a secure communication link can be established on the basis of this security key S-$K_{eNB}$ between the mobile station and the secondary base station.

In a variation of step 7, the mobile station first determines whether the incremented freshness counter, included in the transmitted reconfiguration message, differs from a previous freshness counter included in a previously transmitted reconfiguration message, and only in case of a different, incremented freshness counter, the mobile station derives the same security key S-$K_{eNB}$.

Subsequently, the mobile station re-initializes, in step 8, the communication with the secondary base station on the basis of the derived, same security key (cf. step 8) for the communication between the mobile station and the secondary base station. From the implementation side, the re-initialization performed by the mobile station may include re-establishing the PDCP sub-layer, re-establishing the RLC sub-layer and resetting the MAC layer.

Further to the implementation of the present embodiment where the reconfiguration message, being a RRC connection reconfiguration message, includes dedicated RACH preamble-Y, this dedicated RACH preamble-Y is subsequently utilized for performing, in step 9, a RACH procedure between the mobile station and the secondary base station.

Advantageously, the RACH procedure between the mobile station and the secondary base station not only updates the timing advance for communication there between but also may be understood, in the context of the disclosure, as a trigger for the secondary base station to perform re-initialization of the communication with the mobile station.

In this respect, the secondary base station re-initializes, in step 10, the communication with the mobile station on the basis of the derived, same security key (cf. steps 4, 6 and 7) for the communication between the mobile station and the secondary base station. From the implementation side, the re-initialization performed by the mobile station may include re-establishing the PDCP sub-layer, re-establishing the RLC sub-layer and resetting the MAC layer.

Subsequently, the mobile station transmits, in step 11, a reconfiguration complete message to the master base station which, in step 12, is forwarded by the master base station to the secondary base station. Particularly, in the present embodiment, the reconfiguration complete message is transmitted by the mobile station after the mobile station and the secondary base station have both re-initialized the communication there between.

This may be achieved, for example, by the mobile station deferring the transmission of the reconfiguration complete message to the master base station by a predetermined time interval. Alternatively, the mobile station may also assume that the secondary base station re-initializes in step 10 its connection faster than the transmission and the forwarding of the reconfiguration complete message in steps 11 and 12 and may immediately transmit same message after completion of the RACH procedure in step 9.

The skilled reader can readily appreciate from the discussion above, that the reconfiguration complete message, forwarded by the mobile station to the master base station, is ciphered by the mobile station using the security key $K_{eNB}$ for communication between each other. In this respect, security can be enforced also for the transmission of this reconfiguration complete message. From an implementation side, the transmission of the reconfiguration complete message between the base stations in step 13 may be effected utilizing the X2 interface.

Even further to the implementation of the present embodiment, in response to the reconfiguration message, being a RRC connection reconfiguration message, the reconfiguration complete message is an RRC connection reconfiguration complete message.

Consequently, having re-initialized the communication in steps 8 and 10, the mobile station and secondary base station are capable of establishing a secure communication link between each other utilizing the same, derived security key $S\text{-}K_{eNB}$.

Advantageously, also in the present embodiment the communication between the mobile station and the secondary base station re-initialized without having to re-initialize the communication between the mobile station and the master base station. In other words, for the communication between the mobile station and the secondary base station a same secure key $S\text{-}K_{eNB}$ is derived which bases on a incremented, hence different, freshness counter and thereby enables establishing a secure communication link there between without requiring re-initialization of the communication with the master base station, inherently requiring derivation of a corresponding security key $K_{eNB}$.

In an alternative implementation of the present embodiment, the reconfiguration message, being a RRC connection reconfiguration message, may include a dedicated preamble from among a plurality of pre-configured preambles, or instead, may include information for indicating a dedicated preamble from among the plurality of pre-configured preambles, namely for performing a RACH procedure between the mobile station and the secondary base station. In this implementation, the master base station controls pre-configuration of the plurality of pre-configured preambles at the secondary base station, for example, using the X2 interface.

More particularly, this implementation assumes a scenario where, for the communication between the mobile station and the secondary base station, a plurality of RACH preambles is pre-configured. Specifically, pre-configuration of RACH preambles may be considered advantageous in situations where not only one but a plurality of mobile stations want to establish a secure communication link with this secondary base station.

Having preemptively pre-configured the secondary base station with the plurality of preambles for performing the RACH procedure between the mobile station and same secondary base station, the mobile station may be transmitted/indicated a dedicated preamble from the plurality of preambles to the mobile station, i.e., without the need for requesting the secondary base station to assign a specific dedicated preamble for the RACH procedure to be performed. In other words, by pre-configuring the secondary base station with the plurality of preambles, this plurality is reserved for the specific purpose of the master base station transmitting/indicating from among the plurality the dedicated preamble to be used for performing a RACH procedure, this specific purpose prevents the secondary base station from assigning it differently as a dedicated preamble.

Consequently, pre-configuring the second base station with the plurality of preambles from among which the master base station can transmit/indicate a dedicated preamble to be used for performing the RACH procedure dispenses with the need for coordinating which of the dedicated preambles of the secondary base station is to be transmitted/indicated by the master base station to the mobile terminal.

Moreover, a distinction between transmitting and indicating of a dedicated preamble in the RRC connection reconfiguration message by the master base station to the mobile station may be useful in case of a small number of preambles (e.g., less than 16 preambles represented with 4 bits) which are pre-configured for performing the RACH procedure between the mobile station and the master base station. In such a case, the transmission efficiency for the RRC connection reconfiguration message improves since less signaling bits are required.

Third Example of a More Detailed Embodiment of the Disclosure

Figure 15:
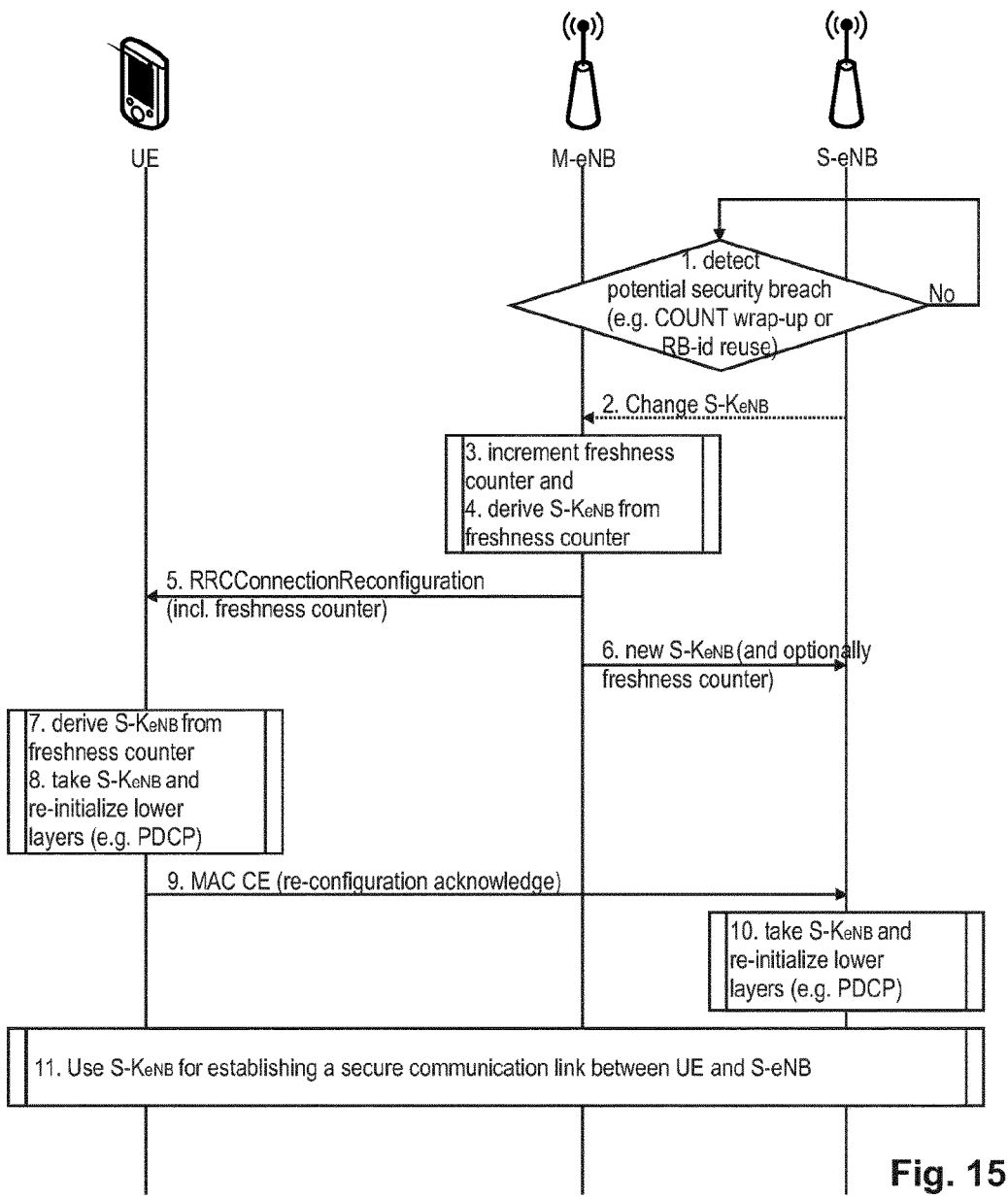

Referring now to FIG. 15 wherein a third example of a more detailed embodiment of the disclosure is shown. This embodiment also illustrates a method for establishing a secure communication link between a mobile station and a secondary base station in a mobile communication system employing dual connectivity. Accordingly, the mobile communication system comprises a master and a secondary base station. The mobile station is initialized for communicating with the master base station and the secondary base station.

In contrast to the second example of a more detailed embodiment, in the present embodiment a scenario is assumed where no dedicated preamble is or can be assigned for performing the RACH procedure between the mobile station and the secondary base station. Nonetheless, also in this embodiment a trigger is required for the secondary base station to synchronize performing re-initialization of the communication with the mobile station.

In this respect, the present embodiment proposes transmitting, by the mobile station, a reconfiguration acknowledge message to the secondary base station (cf. step 9). Thereby, the implementation complexity in the present embodiment can be reduced, namely by omitting the assignment of a dedicated preamble to the mobile station for performing the RACH procedure between it and the secondary base station. Further, in the present embodiment the processing time of establishing the secure communication link between the mobile station and the secondary base station reduces.

Supposing that the communication between the mobile station and the master and the secondary base station is respectively initialized, either the master or the secondary base station perform, in step 1, the operation of detecting a potential security breach. As discussed above, the potential security breach may be detected as a condition where a sequence counter of PDUs is about to wrap-up or where a communication link identification is to be reused since initialization of the communication between the mobile station and the secondary base station.

In case the secondary base station detects, for example, the condition where a sequence counter of packet data units of an established secure communication link between the mobile station and the secondary base station is about to wrap-up or actually wraps-up, same secondary base station signals, in step 2, the detected security breach to the master base station. Since in an alternative case, the master base station may equally detect a security breach, the signaling of the detected security breach is indicated as being optional by way of a dashed line.

Signaling of the detected security breach by the secondary base station to the master base station may correspond to a message requesting the change of the security key $S\text{-}K_{eNB}$ on which the communication between mobile station and the secondary base station is based.

In response to the detected or signaled security breach, the master base station increments, in step 3, a freshness counter maintained for the communication between the mobile station and the secondary base station. This freshness counter is for re-initializing the communication between the mobile station and the secondary base station in that it allows enforcing network access security there between.

Subsequently, the master base station, in step 4, derives on the basis of the incremented freshness counter a new security key $S\text{-}K_{eNB}$ for the communication between the mobile station and the secondary base station. As discussed in the description above, the derivation of the security key S-K$_{eNB}$ is not only based on the incremented freshness counter but also on the security key K$_{eNB}$ for the communication between the mobile station and the master base station which is also available to both communication partners.

Advantageously, the present embodiment dispenses with the need for the master base station to re-initialize this communication between the mobile station and the master base station, and, hence, with the need for the master base station to derive a new security key K$_{eNB}$ therefore.

Having derived the new security key S-K$_{eNB}$ for the communication between the mobile station and the secondary base station, the master base station generates, in step 5, a reconfiguration message including the incremented freshness counter for re-initializing the communication between the mobile station and the secondary base station. The master base station then transmits same message to the mobile station.

In an implementation of the present embodiment, the reconfiguration message is an RRC connection reconfiguration message and includes additional information commonly included in the message. However, in the present embodiment, the RRC connection reconfiguration message does not include a dedicated preamble for performing a RACH procedure. As noted above, in the present embodiment, it might be the case that no dedicated preambles is or can be assigned.

Subsequently, the master base station transmits, in step 6, the newly derived security key S-K$_{eNB}$ and the incremented freshness counter to the secondary base station. From an implementation side, the transmission of the newly derived security key S-K$_{eNB}$ and the incremented freshness counter may be effected utilizing the X2 interface.

The skilled reader can readily appreciate from the discussion above, that the reconfiguration message transmitted by the master base station to the mobile station is ciphered by the master base station using the security key K$_{eNB}$ for communication between each other. In this respect, security can be enforced for the transmission of the incremented freshness counter without adding implementation complexity, simply due to the fact that that the present embodiment dispenses with the need for re-initializing the communication between the mobile station and the master base station.

Furthermore, from the description above, it becomes apparent that the steps 5 and 6 may also be carried out by the master base station in reversed order, namely that the reconfiguration message including the incremented freshness counter is transmitted (cf. step 5) to the mobile station after, and not before transmitting (cf. step 6) the newly derived security key S-K$_{eNB}$ and the incremented freshness counter to the secondary base station.

In the context of the disclosure, the reception of this reconfiguration message by the mobile station may be understood as a trigger for the mobile station to perform re-initialization of the communication with the secondary base station.

Accordingly, the mobile station derives, in step 7, a security key S-K$_{eNB}$ for the communication with the secondary base station on the basis of the freshness counter included in the forwarded reconfiguration message. This security key S-K$_{eNB}$, which is derived by the mobile station, is same to the security key S-K$_{eNB}$ derived in step 4 by the master base station and transmitted in step 6 to the secondary base station.

Consequently, since both, the mobile station and the secondary base station are provided with the same, derived security key S-K$_{eNB}$, a secure communication link can be established on the basis of this security key S-K$_{eNB}$ between the mobile station and the secondary base station.

In a variation of step 7, the mobile station first determines whether the incremented freshness counter, included in the transmitted reconfiguration message, differs from a previous freshness counter included in a previously transmitted reconfiguration message, and only in case of a different, incremented freshness counter, the mobile station derives the same security key S-K$_{eNB}$.

Subsequently, the mobile station re-initializes, in step 8, the communication with the secondary base station on the basis of the derived, same security key (cf. step 8) for the communication between the mobile station and the secondary base station. From the implementation side, the re-initialization performed by the mobile station may include re-establishing the PDCP sub-layer, re-establishing the RLC sub-layer and resetting the MAC layer.

After completion of the re-initialization of the communication with the secondary base station, the mobile station acknowledges same by transmitting, in step 9, a reconfiguration acknowledge message to the secondary base station. From an implementation side, the transmission of the reconfiguration acknowledge message between the base stations in step 13 may be effected utilizing the X2 interface.

In an implementation of the present embodiment, the reconfiguration acknowledge message is effected to the secondary base station in form of a Medium Access Control, MAC, Control Element, CE. Specifically, the reconfiguration acknowledgement may be included in the transmission of a MAC control element, by using a specific type of MAC CE for the reconfiguration message which is indicated by way of a pre-defined Logical Channel ID, LCID in a previous transmission.

Particularly, in this implementation, the reconfiguration message including the freshness counter may be transmitted and/or forwarded to the mobile station (cf. step 5) in form of a MAC packet data unit, PDU. This MAC PDU may include in its MAC header the pre-defined LCID identifying the type of MAC CE to be used for the reconfiguration acknowledge message in form of the MAC CE. Accordingly, should the mobile station in between steps 5 and 9 be required to perform transmissions different from transmitting the reconfiguration acknowledge message, in step 9, the mobile station may use MAC CE of a different type than that indicated by the pre-defined LCID.

Advantageously, the reconfiguration acknowledge message, being transmitted by the mobile station to the secondary base station, may be understood, in the context of the disclosure, as a trigger for the secondary base station to perform re-initialization of the communication with the mobile station.

In this respect, the secondary base station re-initializes, in step 10, the communication with the mobile station on the basis of the derived, same security key (cf. steps 4, 6 and 7) for the communication between the mobile station and the secondary base station. From the implementation side, the re-initialization performed by the mobile station may include re-establishing the PDCP sub-layer, re-establishing the RLC sub-layer and resetting the MAC layer.

Consequently, having re-initialized the communication in steps 8 and 10, the mobile station and secondary base station are capable of establishing a secure communication link between each other utilizing the same, derived security key S-K$_{eNB}$.

Advantageously, also in the present embodiment the communication between the mobile station and the secondary base station re-initialized without having to re-initialize the communication between the mobile station and the master base station. In other words, for the communication between the mobile station and the secondary base station a same secure key S-$K_{eNB}$ is derived which bases on a incremented, hence different, freshness counter and thereby enables establishing a secure communication link there between without requiring re-initialization of the communication with the master base station, inherently requiring derivation of a corresponding security key $K_{eNB}$.

Further to the implementation of the present embodiment illustrated in FIG. 15, including the reconfiguration message in form of a MAC CE, it can be readily appreciated that due to omission of performing the RACH procedure, the processing time for establishing the secure communication link between the mobile station and the secondary base station decreases by approximately 5 to 15 ms when compared to the implementation of second example of the more detailed embodiment shown in FIG. 14.

Fourth Example of a More Detailed Embodiment of the Disclosure

Figure 16:
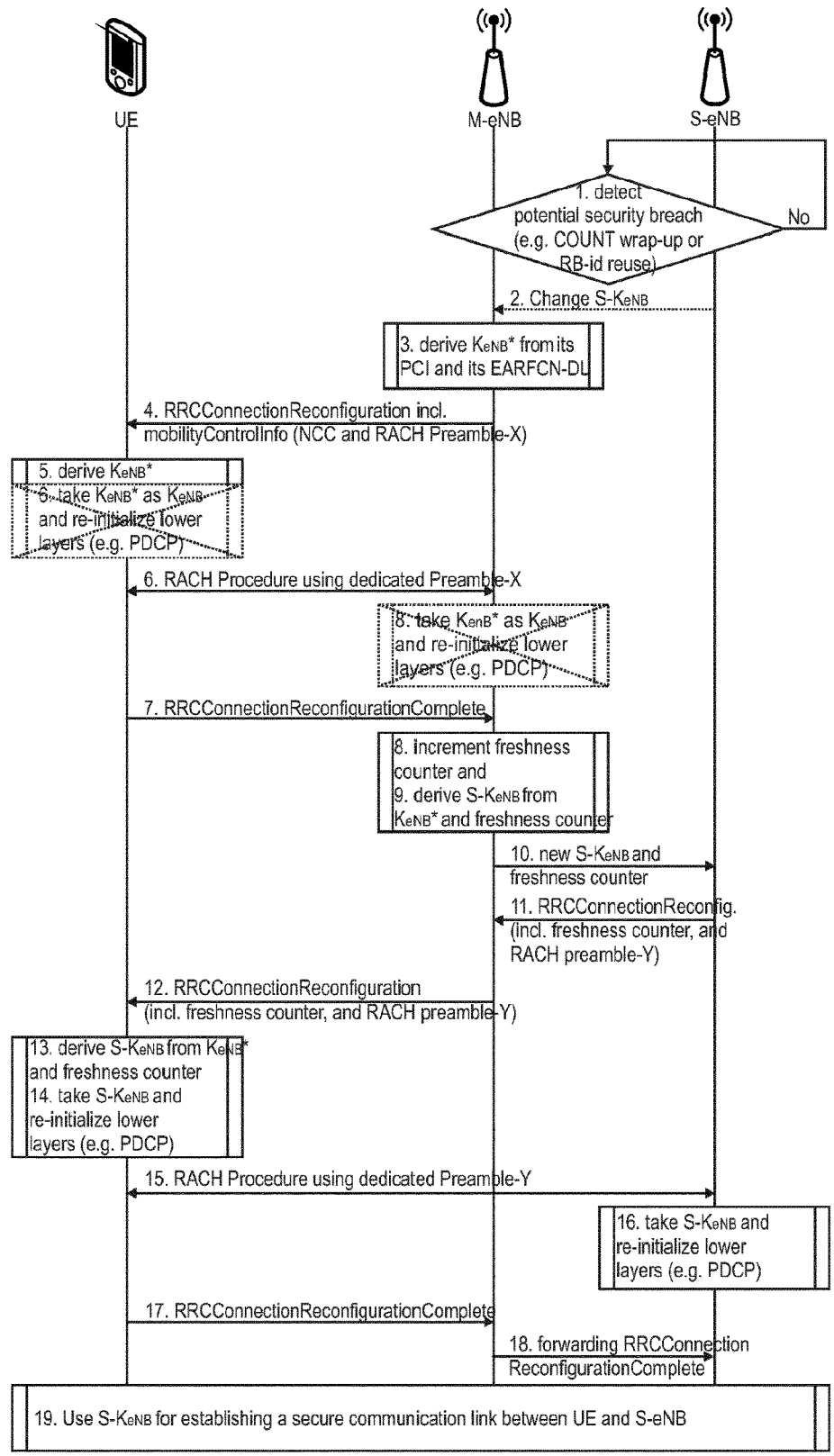

Referring now to FIG. 16 wherein a fourth example of a more detailed embodiment of the disclosure is shown. This embodiment also illustrates a method for establishing a secure communication link between a mobile station and a secondary base station in a mobile communication system employing dual connectivity. Accordingly, the mobile communication system comprises a master and a secondary base station. The mobile station is initialized for communicating with the master base station and the secondary base station.

In contrast to the previous examples of a more detailed embodiment, in the present embodiment a scenario is assumed where not only a new security key S-$K_{eNB}$ for the communication between the mobile station and the secondary base station is derived, but also this newly derived security key S-KeNB is based on a newly derived security key $K_{eNB}^*$ for the communication between the mobile station and the master base station. However, this newly derived security key $K_{eNB}^*$ is not used for re-initializing the communication between the mobile terminal and the master base station.

Instead, the new security key $K_{eNB}^*$ is only maintained in the master base station and the mobile station for the purpose of subsequently deriving a new security key S-$K_{eNB}$ for the communication between the mobile terminal and the secondary base station.

Advantageously, the present embodiment dispenses with the need for the mobile station and the master base station to re-initialize the communication between each other. In this respect, also the "old" security key $K_{eNB}$ is maintained in the mobile station and the master base station for the communication there between (e.g., for ciphering the communication between the mobile station and the master base station).

Supposing that the communication between the mobile station and the master and the secondary base station is respectively initialized, either the master or the secondary base station perform, in step 1, the operation of detecting a potential security breach. As discussed above, the potential security breach may be detected as a condition where a sequence counter of PDUs is about to wrap-up or where a communication link identification is to be reused since initialization of the communication between the mobile station and the secondary base station.

In case the secondary base station detects, for example, the condition where a sequence counter of packet data units of an established secure communication link between the mobile station and the secondary base station is about to wrap-up or actually wraps-up, same secondary base station signals, in step 2, the detected security breach to the master base station. Since in an alternative case, the master base station may equally detect a security breach, the signaling of the detected security breach is indicated as being optional by way of a dashed line.

Signaling of the detected security breach by the secondary base station to the master base station may correspond to a message requesting the change of the security key S-$K_{eNB}$ on which the communication between mobile station and the secondary base station is based.

In response to the detected or signaled security breach, the master base station derives, in step 3, a new security key $K_{eNB}^*$ which could be used for re-initializing the communication between the mobile station and the secondary base station.

However, already at this point of the description, it shall be made clear that the, in step 3, newly derived security key $K_{eNB}^*$ is only maintained in the master base station and the mobile station for deriving a new security key S-$K_{eNB}$ for the communication between the mobile terminal and the secondary base station (cf. steps 9, 10 and 13). Accordingly, also the "old" security key $K_{eNB}$ is maintained in the mobile station and the master base station for communication there between (e.g., for ciphering the communication between the mobile station and the master base station).

Subsequently, the master base station, in step 4, generates a reconfiguration message including a handover command for the communication between the mobile station and the master base station. As part of the handover command, information is included which allows (cf. step 5) the mobile station to derive a same, new security key $K_{eNB}^*$ which could be used for the communication between it and the master base station. This reconfiguration message including the handover command is transmitted by the master base station to the mobile station.

In an implementation of the present embodiment, the reconfiguration message is an RRC connection reconfiguration message which includes, as handover command, mobility control information titled "mobilityControlInfo". The mobility control information includes, for example, the Next hop Chaining Counter, NCC, on the basis of which the mobile station, upon receipt of the RRC connection configuration message is capable of deriving a same new security key $K_{eNB}^*$ for the communication between it and the master base station.

Furthermore, in the implementation of the present embodiment, the mobility control information, being the handover command included in the RRC connection reconfiguration message, additionally includes a dedicated RACH preamble. For illustrated purposes, the dedicated RACH preamble is titled RACH preamble-X.

In the context of the disclosure, the reception of this reconfiguration message by the mobile station may be understood as a trigger for the mobile station to derive the security key $K_{eNB}^*$ for communication between the mobile station and the master base station.

In this respect, the mobile station derives, in step 5, a new security key $K_{eNB}^*$ for the communication with the master base station on the basis of the NCC included in the handover command transmitted as part of the reconfiguration message. This security key $K_{eNB}^*$, which is derived by the mobile station, is same to the security key $K_{eNB}^*$ derived in step 4 by the master base station and transmitted in step 5 to the secondary base station.

Similarly to the above, at this point it shall also be made clear that the, in step 5, newly derived security key $K_{eNB}{*}$ is only maintained in the mobile station and the master base station for deriving a new security key $S\text{-}K_{eNB}$ for the communication between the mobile terminal and the secondary base station (cf. steps 9, 10 and 13). Accordingly, also the "old" security key $K_{eNB}$ is maintained in the mobile station and the master base station for communication there between (e.g., for ciphering the communication between the mobile station and the master base station).

Further, it is important to note that the reception of this reconfiguration message by the mobile station does not trigger same to perform on the basis of the newly derived security key $K_{eNB}{*}$ re-initialization of the communication with the master base station. Accordingly, the mobile station does not take the newly derived security key $K_{eNB}{*}$ as $K_{eNB}$ and does not use this derived security key $K_{eNB}{*}$ (or as $K_{eNB}$) for re-initializing the communication with the master base station. For illustrative purposes, a hypothetical operation of taking the derived security key $K_{eNB}{*}$ as $K_{eNB}$ and using it for re-initializing the communication is crossed out, hence indicating that this operation is not performed by the mobile station.

Consequently, from the implementation side, the master base station does not perform any of the following operations, namely re-establishing the PDCP sub-layer, re-establishing the RLC sub-layer or resetting the MAC layer with respect to the communication between it and the master base station.

Further to the implementation of the present embodiment where the reconfiguration message of step 4, being a RRC connection reconfiguration message, includes dedicated RACH preamble-X, this dedicated RACH preamble-X is subsequently utilized for performing, in step 6, a RACH procedure between the mobile station and the secondary base station.

Also in this case, it is important to note that the RACH procedure between the mobile station and the master base station only updates the timing advance for communication there between but cannot be understood as a trigger for the master base station to perform re-initialization of the communication with the mobile station. For illustrative purposes, a hypothetical operation of taking the derived security key $K_{eNB}{*}$ as $K_{eNB}$ and using it for re-initializing the communication is crossed out, hence indicating that this operation is not performed by the master base station.

Consequently, from the implementation side, the master base station does not perform any of the following operations, namely re-establishing the PDCP sub-layer, re-establishing the RLC sub-layer or resetting the MAC layer with respect to the communication between it and the master base station.

Subsequently, the mobile station transmits, in step 7, a reconfiguration complete message to the master base station. In the implementation of the present embodiment, in response to the reconfiguration message, being a RRC connection reconfiguration message in step 4, the reconfiguration complete message is an RRC connection reconfiguration complete message in step 7.

Advantageously, the reconfiguration complete message, being transmitted by the mobile station to the master base station, may be understood, in the context of the disclosure, as a trigger for the master base station to control the mobiles station and the secondary base station to perform re-initialization of the communication there between, including derivation of a same security key $S\text{-}K_{eNB}$ on the basis of an incremented freshness counter for establishing a secure communication link utilizing same derived security key $S\text{-}K_{eNB}$.

In this respect, the master base station increments, in step 8, a freshness counter maintained for the communication between the mobile station and the secondary base station. This freshness counter is for re-initializing the communication between the mobile station and the secondary base station in that it allows enforcing network access security there between.

In this respect, the master base station, in step 9, derives on the basis of the incremented freshness counter a new security key $S\text{-}K_{eNB}$ for the communication between the mobile station and the secondary base station. As discussed in the description above, the derivation of the security key $S\text{-}K_{eNB}$ is not only based on the incremented freshness counter but also on a security key $K_{eNB}{*}$. Notably, in the present embodiment, the newly derived security key $K_{eNB}{*}$ is used by the master base station in step 8 instead of the "old" security key $K_{eNB}$ which are both maintained in the mobile station and in the master base station is as discussed above.

Specifically, in steps 3 and 5, the newly derived security key $K_{eNB}{*}$ is only maintained in the mobile station and the master base station for deriving the new security key $S\text{-}K_{eNB}$ for the communication between the mobile terminal and the secondary base station (cf. steps 9, 10 and 13) whereas the "old" security key $K_{eNB}$ is maintained in the mobile station and the master base station for communication there between (e.g., for ciphering the communication between the mobile station and the master base station).

Having derived the new security key $S\text{-}K_{eNB}$ for the communication between the mobile station and the secondary base station, the master base station transmits, in step 10, this newly derived security key $S\text{-}K_{eNB}$ and the incremented freshness to the secondary base station. From an implementation side, the transmission of the newly derived security key $S\text{-}K_{eNB}$ and the incremented freshness counter may be effected utilizing the X2 interface.

Subsequently, the secondary base station generates, in step 11, a reconfiguration message including the incremented freshness counter for re-initializing the communication between the mobile station and the secondary base station. The secondary base station then transmits same message to the master base station. From an implementation side, the transmission of the reconfiguration message may be effected utilizing the X2 interface.

In the implementation of the present embodiment, the reconfiguration message of step 11 is an RRC connection reconfiguration message and includes additional information commonly included in the message. In particular, the RRC connection reconfiguration message additionally includes a dedicated Random Access CHannel, RACH, preamble. For illustrative purposes, the dedicated RACH preamble is titled RACH preamble-Y.

The reconfiguration message, generated by the secondary base station, is then forwarded, in step 12, by the master base station to the mobile station. Even though the reconfiguration message is received from the master base station, the mobile station can identify from its content that it is generated by and, hence, is linked to (i.e., related to) the communication with the secondary base station and not to the communication with the master base station.

The skilled reader can readily appreciate from the discussion above, that the reconfiguration message forwarded by the master base station to the mobile station is ciphered by the master base station using the "old" security key $K_{eNB}$ for communication between each other. In this respect, security can be enforced for the transmission of the incremented freshness counter without adding implementation complexity, simply due to the fact that that the present embodiment dispenses with the need for re-initializing the communication between the mobile station and the master base station.

In the context of the disclosure, the reception of this reconfiguration message by the mobile station may be understood as a trigger for the mobile station to perform re-initialization of the communication with the secondary base station.

Accordingly, the mobile station derives, in step 13, a security key S-$K_{eNB}$ for the communication with the secondary base station on the basis of the freshness counter included in the forwarded reconfiguration message. This security key S-$K_{eNB}$, which is derived by the mobile station, is same to the security key S-$K_{eNB}$ derived in step 4 by the master base station and transmitted in step 5 to the secondary base station.

As discussed in the description above, the derivation of the security key S-$K_{eNB}$ is not only based on the incremented freshness counter but also on a security key $K_{eNB}^*$. Notably, in the present embodiment, the newly derived security key $K_{eNB}^*$ is used by the mobile station in step 13 instead of the "old" security key $K_{eNB}$ which are both maintained in the mobile station and in the master base station is as discussed above.

Consequently, since both, the mobile station and the secondary base station are provided with the same, derived security key S-$K_{eNB}$, a secure communication link can be established on the basis of this security key S-$K_{eNB}$ between the mobile station and the secondary base station.

In a variation of step 13, the mobile station first determines whether the incremented freshness counter, included in the transmitted reconfiguration message, differs from a previous freshness counter included in a previously transmitted reconfiguration message, and only in case of a different, incremented freshness counter, the mobile station derives the same security key S-$K_{eNB}$.

Subsequently, the mobile station re-initializes, in step 14, the communication with the secondary base station on the basis of the derived, same security key (cf. step 13) for the communication between the mobile station and the secondary base station. From the implementation side, the re-initialization performed by the mobile station may include re-establishing the PDCP sub-layer, re-establishing the RLC sub-layer and resetting the MAC layer.

Further to the implementation of the present embodiment, the reconfiguration message, being a RRC connection reconfiguration message, includes dedicated RACH preamble-y, which is subsequently utilized for performing, in step 15, a RACH procedure between the mobile station and the secondary base station.

Advantageously, the RACH procedure between the mobile station and the secondary base station not only updates the timing advance for communication there between but also may be understood, in the context of the disclosure, as a trigger for the secondary base station to perform re-initialization of the communication with the mobile station.

In this respect, the secondary base station re-initializes, in step 16, the communication with the mobile station on the basis of the derived, same security key (cf. step 4 and 5) for the communication between the mobile station and the secondary base station. From the implementation side, the re-initialization performed by the mobile station may include re-establishing the PDCP sub-layer, re-establishing the RLC sub-layer and resetting the MAC layer.

Subsequently, the mobile station transmits, in step 17, a reconfiguration complete message to the master base station which, in step 18, is forwarded by the master base station to the secondary base station. Particularly, in the present embodiment, the reconfiguration complete message is transmitted by the mobile station after the mobile station and the secondary base station have both re-initialized the communication there between.

This may be achieved, for example, by the mobile station deferring the transmission of the reconfiguration complete message to the master base station by a predetermined time interval. Alternatively, the mobile station may also assume that the secondary base station re-initializes in step 16 its connection faster than the transmission and the forwarding of the reconfiguration complete message in steps 17 and 18 and may immediately transmit same message after completion of the RACH procedure in step 15.

The skilled reader can readily appreciate from the discussion above, that the reconfiguration complete message, forwarded by the mobile station to the master base station, is ciphered by the mobile station using the "old" security key $K_{eNB}$ for communication between each other. In this respect, security can be enforced also for the transmission of this reconfiguration complete message. From an implementation side, the transmission of the reconfiguration complete message between the base stations in step 13 may be effected via the X2 interface.

Even further to the implementation of the present embodiment, in response to the reconfiguration message, being a RRC connection reconfiguration message, the reconfiguration complete message is an RRC connection reconfiguration complete message.

Consequently, having re-initialized the communication in steps 14 and 16, the mobile station and secondary base station are capable of establishing a secure communication link between each other utilizing the same, derived security key S-$K_{eNB}$.

Advantageously, also in the present embodiment the communication between the mobile station and the secondary base station re-initialized without having to re-initialize the communication between the mobile station and the master base station. In other words, for the communication between the mobile station and the secondary base station a same secure key S-$K_{eNB}$ is derived which bases on a incremented, hence different, freshness counter and thereby enables establishing a secure communication link there between without requiring re-initialization of the communication with the master base station.

In summary, the above described fourth example offers with respect to a conventional Intra-cell handover the following benefits. Firstly, the secure communication links established (i.e., radio bearers) established in the macro cell group, MCG, will not be interrupted un-necessarily. Secondly, the time for establishing a secure communication link in case of a detected potential security breach including derivation (i.e., refreshing) new security key S-KeNB will be faster because the secure key S-KeNB derivation will no longer depend on the completion of intra-cell handover. Finally, a special UE behavior/implementation is not required: in the state-of-the-art a UE/network releases the secondary cell group, SCG, during MeNB-SeNB handover which also includes an intra-cell handover. To be able to use intra-cell handover to enforce network access security, the SCG release is not be performed to refresh the S-KeNB which in itself is a new behavior to the commonly known intra-cell handover.

In FIG. 16, the intra-cell handover for changing the $K_{eNB}$ of steps 4-7 and the procedure of deriving S-$K_{eNB}$ in steps 8-18 are two separate procedures. According to a variation of the above described fourth example of a more detailed embodiment, the two procedures are combined resulting in the UE deriving the $K_{eNB}$ and also the S-$K_{eNB}$ from the new $K_{eNB}$ at a same time, namely upon receiving intra-cell handover command termed mobility control info and included in the RRC connection reconfiguration message in step 4.

In this variation it must be clarified based on what input parameters the UE decides to (re)derive the S-$K_{eNB}$. In this respect, it should be noted that the Next hop Chaining Counter, NCC, alone is not be sufficient. Consequently, it is proposed to additionally provide an incremented freshness parameter. Upon detecting an incremented freshness parameter, the UE then (re)derive the S-$K_{eNB}$ from the new $K_{eNB}$ and incremented freshness parameter. In another simplified version of this variation, the UE refreshes/re-derives the S-$K_{eNB}$ whenever a freshness parameter is sent/indicated by the network without the UE checking if the received freshness parameter is incremented with respect to the previously received freshness counter (i.e., the last freshness parameter stored by the UE, and was used for a successful S-$K_{eNB}$ derivation). In summary, also here the S-$K_{eNB}$ derivation is always based on most recently derived $K_{eNB}$ and the most recently received freshness parameter.

Hardware and Software Implementation of the Disclosure

Another embodiment of the disclosure relates to the implementation of the above described various embodiments using hardware and software, or hardware only. In this connection the disclosure provides an user equipment (mobile terminal) and a master and secondary eNodeB (base station). The user equipment and base station are adapted to perform the methods described herein.

It is further recognized that the various embodiments of the disclosure may be implemented or performed using computing devices (processors). A computing device or processor may for example be general purpose processors, digital signal processors (DSP), application specific integrated circuits (ASIC), field programmable gate arrays (FPGA) or other programmable logic devices, etc. In addition, radio transmitter and radio receiver and other necessary hardware may be provided in the apparatuses (UE, MeNB, SeNB). The various embodiments of the disclosure may also be performed or embodied by a combination of these devices.

Further, the various embodiments of the disclosure may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the disclosure may individually or in arbitrary combination be subject matter to another disclosure.

It would be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects to be illustrative and not restrictive.

The invention claimed is:

1. A master base station apparatus, comprising:
a receiver, which, in operation, receives from a secondary base station a change request of a secondary security key when a value of a COUNT exceeds a threshold value, wherein the secondary security key is a security key for the secondary base station;
control circuitry, which, in operation, increments a freshness counter and derives an updated secondary security key for the secondary base station by using the incremented freshness counter and a currently active security key of the master base station without refreshing the current active security key of the master base station; and
a transmitter, which, in operation, transmits the updated secondary security key to the secondary base station.

2. The master base station apparatus according to claim 1, wherein the COUNT is composed of a packet data convergence protocol (PDCP) sequence number and a hyper frame number (HFN) that is shared between the secondary base station and a mobile terminal.

3. The master base station apparatus according to claim 1, wherein the currently active security key of the master base station apparatus is not updated in response to the change request.

4. The master base station apparatus according to claim 1, wherein the transmitter, in operation, transmits an RRCConnectionReconfiguration message to a mobile terminal after deriving the updated secondary security key.

5. The master base station apparatus according to claim 1, wherein the freshness counter is a counter value for refresh of the secondary security key.

6. A communication method for a master base station apparatus, the communication method comprising:
receiving from a secondary base station a change request of a secondary security key when a value of a COUNT exceeds a threshold value, wherein the secondary security key is a security key for the secondary base station;
incrementing a freshness counter and deriving an updated secondary security key for the secondary base station by using the incremented freshness counter and a currently active security key of the master base station without refreshing the current active security key of the master base station; and
transmitting the updated secondary security key to the secondary base station.

7. The communication method according to claim 6, wherein the COUNT is composed of a packet data convergence protocol (PDCP) sequence number and a hyper frame number (HFN) that is shared between the secondary base station and a mobile terminal.

8. The communication method according to claim 6, wherein the currently active security key of the master base station apparatus is not updated in response to the change request.

9. The communication method according to claim 6, comprising:
transmitting an RRCConnectionReconfiguration message to a mobile terminal after deriving the updated secondary security key.

10. The communication method according to claim 6, wherein the freshness counter is a counter value for refresh of the secondary security key.

\* \* \* \* \*